US012186763B2

(12) United States Patent
Fritz et al.

(10) Patent No.: US 12,186,763 B2
(45) Date of Patent: Jan. 7, 2025

(54) PRINT HEAD WITH A DISPLACING MECHANISM FOR A NOZZLE ROW

(71) Applicant: Dürr Systems AG, Bietigheim-Bissingen (DE)

(72) Inventors: Hans-Georg Fritz, Ostfildern (DE); Benjamin Wöhr, Eibensbach (DE); Marcus Kleiner, Besigheim (DE); Moritz Bubek, Ludwigsburg (DE); Timo Beyl, Besigheim (DE); Frank Herre, Oberriexingen (DE); Steffen Sotzny, Oberstenfeld (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 651 days.

(21) Appl. No.: 16/468,699

(22) PCT Filed: Dec. 1, 2017

(86) PCT No.: PCT/EP2017/081121

§ 371 (c)(1), (2) Date: Jun. 12, 2019

(87) PCT Pub. No.: WO2018/108572

PCT Pub. Date: Jun. 21, 2018

(65) Prior Publication Data

US 2019/0337311 A1 Nov. 7, 2019

(30) Foreign Application Priority Data

Dec. 14, 2016 (DE) ..................... 10 2016 014 920.5

(51) Int. Cl.
*B05B 1/14* (2006.01)
*B05B 13/04* (2006.01)
(Continued)

(52) U.S. Cl.
CPC ............ *B05B 1/14* (2013.01); *B05B 13/0452* (2013.01); *B41J 3/4073* (2013.01); *B41J 25/001* (2013.01)

(58) Field of Classification Search
CPC ......... B41J 25/001; B41J 25/003; B05B 1/14; B05B 13/0425
See application file for complete search history.

(56) References Cited

U.S. PATENT DOCUMENTS 3,421,694 A 1/1969 Muller
3,717,306 A 2/1973 Hushon et al.
(Continued)

FOREIGN PATENT DOCUMENTS

CN 2287527 Y 8/1998
CN 1331661 A 1/2002
(Continued)

OTHER PUBLICATIONS

Final Office Action mailed Mar. 19, 2021 for U.S. Appl. No. 16/468,696 (45 pages).
(Continued)

*Primary Examiner* — Dah-Wei D. Yuan
*Assistant Examiner* — Stephen A Kitt
(74) *Attorney, Agent, or Firm* — Taft Stettinius & Hollister LLP; Thomas E. Bejin

(57) ABSTRACT

The disclosure relates to an application device for the application of an application medium onto a component, preferably for application of a paint onto a motor vehicle body component, comprising: at least one print head for application of the application medium preferably in series and for mounting on an application robot, and at least two nozzle rows which can be moved by the application robot, wherein the at least two nozzle rows comprise a first nozzle row with several nozzles for the output of application
(Continued)

medium jets and at least one further nozzle row with several nozzles for the output of application medium jets. The application device is characterised in particular in that at least one nozzle row of the at least two nozzle rows is movable for the purpose of position adjustment of the nozzles of the first nozzle row and the nozzles of the at least one further nozzle row.

33 Claims, 12 Drawing Sheets

(51) Int. Cl.
*B41J 3/407* (2006.01)
*B41J 25/00* (2006.01)

(56) References Cited

U.S. PATENT DOCUMENTS 3,981,320 A 9/1976 Wiggins
4,141,231 A 2/1979 Kudlich
4,375,865 A 3/1983 Springer
4,383,264 A 5/1983 Lewis
4,423,999 A 1/1984 Choly
4,430,010 A 2/1984 Zrenner et al.
4,435,719 A 3/1984 Snaper
4,478,241 A 10/1984 Cardenas-Franco
4,555,719 A 11/1985 Arway et al.
4,593,360 A 6/1986 Cocks
4,668,948 A 5/1987 Merkel
4,714,044 A 12/1987 Kikuchi
4,734,711 A 3/1988 Piatt et al.
4,826,135 A 5/1989 Mielke
4,894,252 A 1/1990 Bongen et al.
4,941,778 A 7/1990 Lehmann
4,974,780 A 12/1990 Nakamura et al.
4,985,715 A * 1/1991 Cyphert .................. B05B 15/55 347/54
5,050,533 A 9/1991 Zaber
5,072,881 A 12/1991 Taube, III
5,429,682 A 7/1995 Harlow, Jr.
5,435,884 A 7/1995 Simmons et al.
5,538,221 A 7/1996 Joswig
5,556,466 A 9/1996 Martin et al.
5,602,575 A 2/1997 Pauly
5,636,795 A 6/1997 Sedgwick et al.
5,647,542 A 7/1997 Diana
5,659,347 A 8/1997 Taylor
5,681,619 A 10/1997 Ogasawara
5,740,967 A 4/1998 Simmons et al.
5,843,515 A 12/1998 Crum et al.
5,951,882 A 9/1999 Simmons et al.
5,964,407 A 10/1999 Sandkleiva
5,976,343 A 11/1999 Schlaak
6,164,746 A * 12/2000 Akahira ................. G02B 5/201 347/15
6,179,217 B1 1/2001 Yoshida et al.
6,325,302 B1 12/2001 Guzowski
6,540,835 B2 4/2003 Kim et al.
6,607,145 B1 8/2003 Boriani et al.
6,641,667 B2 11/2003 Ochiai et al.
6,712,285 B2 3/2004 Provenaz et al.
6,777,032 B2 8/2004 Ogasahara et al.
6,811,807 B1 11/2004 Zimmermann et al.
6,849,684 B2 2/2005 Poppe et al.
7,160,105 B2 1/2007 Edwards
7,178,742 B2 2/2007 Nellentine et al.
7,182,815 B2 2/2007 Katagami et al.
7,244,310 B2 7/2007 Edwards
7,270,712 B2 9/2007 Edwards
7,357,959 B2 4/2008 Bauer
7,387,071 B2 6/2008 Heinke et al.
7,449,070 B2 11/2008 Fellingham
7,604,333 B2 10/2009 Horsnell
7,757,632 B2 7/2010 Edwards
7,837,071 B2 11/2010 Achrainer
7,901,741 B2 3/2011 Katagami et al.
8,028,651 B2 10/2011 Rademacher et al.
8,118,385 B2 2/2012 Van De Wynckel et al.
8,449,087 B2 5/2013 Kataoka et al.
8,545,943 B2 10/2013 Frankenberger et al.
8,652,581 B2 2/2014 Merchant
8,678,535 B2 3/2014 Beier et al.
8,875,655 B2 11/2014 Pettersson et al.
8,882,242 B2 11/2014 Beier et al.
9,010,899 B2 * 4/2015 Harjee ................ H01L 51/0012 347/14
9,108,424 B2 8/2015 Wallsten et al.
9,140,247 B2 9/2015 Herre et al.
9,156,054 B2 10/2015 Ikushima
9,266,353 B2 2/2016 Beier et al.
9,393,787 B2 7/2016 Ikushima
9,464,573 B2 10/2016 Remy et al.
9,592,524 B2 3/2017 Fritz et al.
9,701,143 B2 7/2017 Ikushima
9,707,585 B2 7/2017 Reimert et al.
9,844,792 B2 12/2017 Pettersson et al.
9,901,945 B2 2/2018 Fehr et al.
9,914,150 B2 3/2018 Pettersson et al.
10,016,977 B2 7/2018 Stefani et al.
10,105,946 B2 10/2018 Nakamura et al.
10,150,304 B2 12/2018 Herre et al.
10,252,552 B2 4/2019 Pitz et al.
10,272,677 B2 4/2019 Stefani et al.
10,464,095 B2 11/2019 Fritz
10,532,569 B2 1/2020 Wallsten et al.
10,814,643 B2 10/2020 Herre
11,504,735 B2 11/2022 Fritz
2001/0006392 A1 * 7/2001 Otsuki ................... B41J 19/145 347/12
2001/0017085 A1 * 8/2001 Kubo ..................... B41J 3/4073 101/35
2001/0019340 A1 9/2001 Kubo et al.
2002/0024544 A1 2/2002 Codos
2002/0043280 A1 4/2002 Ochiai et al.
2002/0043567 A1 4/2002 Provenaz et al.
2002/0105688 A1 * 8/2002 Katagami .............. G02B 5/201 235/462.32
2002/0109741 A1 * 8/2002 Okabe .................... G02B 5/201 347/14
2002/0128371 A1 9/2002 Poppe et al.
2003/0020783 A1 1/2003 Sanada
2003/0041884 A1 3/2003 Bahr
2003/0049383 A1 3/2003 Ogasahara et al.
2003/0063154 A1 * 4/2003 Goto ...................... B41J 25/003 347/40
2004/0028830 A1 2/2004 Bauer
2004/0089234 A1 5/2004 Hagglund et al.
2004/0107900 A1 6/2004 Clifford et al.
2004/0123159 A1 6/2004 Kerstens
2004/0173144 A1 9/2004 Edwards
2004/0221804 A1 11/2004 Zimmermann et al.
2004/0231594 A1 11/2004 Edwards
2004/0238522 A1 12/2004 Edwards
2004/0256501 A1 12/2004 Mellentine et al.
2004/0261700 A1 * 12/2004 Edwards .................... B41J 2/04 118/679
2005/0000422 A1 1/2005 Edwards
2005/0015050 A1 1/2005 Mowery et al.
2005/0016451 A1 1/2005 Edwards
2005/0023367 A1 2/2005 Reighard et al.
2005/0156963 A1 * 7/2005 Song .................... B41J 2/04586 347/9
2005/0243112 A1 * 11/2005 Kobayashi ............. B41J 25/003 347/12
2006/0061613 A1 3/2006 Fienup et al.
2006/0068109 A1 3/2006 Frankenberger et al.
2006/0146379 A1 7/2006 Katagami et al.
2006/0238587 A1 10/2006 Horsnell
2006/0251796 A1 11/2006 Fellingham
2007/0062383 A1 3/2007 Gazeau
2007/0292626 A1 12/2007 Larsson et al.
2008/0271674 A1 11/2008 Rademarcher

(56) References Cited

U.S. PATENT DOCUMENTS

| | | | |
|---|---|---|---|
| 2008/0309698 A1 | 12/2008 | Nakano et al. | |
| 2009/0027433 A1 | 1/2009 | Van De Wynckel et al. | |
| 2009/0029069 A1 | 1/2009 | Edwards | |
| 2009/0117283 A1 | 5/2009 | Herre | |
| 2009/0181182 A1 | 7/2009 | Sloan | |
| 2009/0244216 A1 | 10/2009 | Niimi | |
| 2010/0132612 A1 | 6/2010 | Achrainer | |
| 2010/0156970 A1 | 6/2010 | Ikushima | |
| 2010/0170918 A1 | 7/2010 | Achrainer | |
| 2010/0225685 A1 | 9/2010 | Kwon et al. | |
| 2010/0279013 A1 | 11/2010 | Frankenberger et al. | |
| 2010/0282283 A1 | 11/2010 | Bauer | |
| 2010/0321448 A1 | 12/2010 | Buestgens et al. | |
| 2011/0014371 A1 | 1/2011 | Herre et al. | |
| 2011/0084150 A1 | 4/2011 | Merchant | |
| 2011/0248046 A1 | 10/2011 | Simion | |
| 2011/0262622 A1 | 10/2011 | Herre | |
| 2012/0085842 A1 | 4/2012 | Ciardella | |
| 2012/0105522 A1 | 5/2012 | Wallsten | |
| 2012/0114849 A1 | 5/2012 | Melcher | |
| 2012/0162331 A1 | 6/2012 | Kataoka | |
| 2012/0186518 A1 | 7/2012 | Herre | |
| 2012/0219699 A1 | 8/2012 | Pettersson et al. | |
| 2012/0249679 A1 | 10/2012 | Beier et al. | |
| 2012/0282405 A1 | 11/2012 | Herre | |
| 2013/0201243 A1 | 8/2013 | Yoshida | |
| 2013/0215203 A1 | 8/2013 | Chen | |
| 2013/0257984 A1 | 10/2013 | Beier et al. | |
| 2013/0284833 A1 | 10/2013 | Fritz et al. | |
| 2014/0076985 A1 | 3/2014 | Pettersson et al. | |
| 2014/0120457 A1 | 5/2014 | Choi | |
| 2014/0184683 A1* | 7/2014 | Harjee | H10K 71/135 347/14 |
| 2014/0242285 A1 | 8/2014 | Pettersson et al. | |
| 2014/0329001 A1 | 11/2014 | Rouaud et al. | |
| 2015/0009254 A1 | 1/2015 | Kaiba et al. | |
| 2015/0042716 A1 | 2/2015 | Beier et al. | |
| 2015/0086723 A1 | 3/2015 | Bustgens | |
| 2015/0098028 A1 | 4/2015 | Ohnishi | |
| 2015/0328654 A1 | 11/2015 | Schwab | |
| 2015/0375258 A1 | 12/2015 | Fritz et al. | |
| 2015/0375507 A1 | 12/2015 | Kushima | |
| 2016/0052312 A1 | 2/2016 | Pitz et al. | |
| 2016/0074822 A1 | 3/2016 | Han | |
| 2016/0288552 A1 | 10/2016 | Ikushima | |
| 2016/0306364 A1 | 10/2016 | Ikushima et al. | |
| 2017/0087837 A1 | 3/2017 | Stefani et al. | |
| 2017/0106393 A1 | 4/2017 | Hamspon et al. | |
| 2017/0128962 A1 | 5/2017 | Kashiyama et al. | |
| 2017/0136481 A1 | 5/2017 | Fritz et al. | |
| 2017/0252765 A1 | 9/2017 | Medard | |
| 2017/0267002 A1 | 9/2017 | Pitz et al. | |
| 2017/0299088 A1 | 10/2017 | Rau | |
| 2017/0361346 A1 | 12/2017 | Lahidjanian et al. | |
| 2018/0022105 A1 | 1/2018 | Nakamura et al. | |
| 2018/0056670 A1 | 3/2018 | Kerr | |
| 2018/0093491 A1 | 4/2018 | Murayama et al. | |
| 2018/0178505 A1 | 6/2018 | Stefani et al. | |
| 2018/0222186 A1 | 8/2018 | Stefani et al. | |
| 2018/0250955 A1 | 9/2018 | Herre | |
| 2019/0091712 A1 | 3/2019 | Medard et al. | |

FOREIGN PATENT DOCUMENTS

| | | | |
|---|---|---|---|
| CN | 1411914 | A | 4/2003 |
| CN | 1438942 | A | 8/2003 |
| CN | 1512919 | A | 7/2004 |
| CN | 1176815 | C | 11/2004 |
| CN | 1668386 | A | 9/2005 |
| CN | 1761530 | A | 4/2006 |
| CN | 101264698 | A | 9/2008 |
| CN | 101309755 | A | 11/2008 |
| CN | 101657264 | A | 2/2010 |
| CN | 101784348 | A | 7/2010 |
| CN | 102177002 | A | 9/2011 |
| CN | 102198434 | A | 9/2011 |
| CN | 102971080 | A | 3/2013 |
| CN | 103153483 | A | 6/2013 |
| CN | 103909743 | A | 7/2014 |
| CN | 104613205 | A | 5/2015 |
| CN | 104994966 | A | 10/2015 |
| CN | 105358259 | A | 2/2016 |
| CN | 205042649 | U | 2/2016 |
| CN | 106414081 | A | 2/2017 |
| DE | 1284250 | A | 11/1968 |
| DE | 7710895 | U1 | 9/1977 |
| DE | 3045401 | A1 | 7/1982 |
| DE | 3221327 | A1 | 9/1983 |
| DE | 3225554 | A1 | 1/1984 |
| DE | 3634747 | A1 | 8/1987 |
| DE | 3804092 | A1 | 9/1988 |
| DE | 4013322 | A1 | 10/1991 |
| DE | 4115111 | A1 | 11/1991 |
| DE | 4138491 | A1 | 5/1993 |
| DE | 9405600 | U1 | 6/1994 |
| DE | 68924202 | T2 | 2/1996 |
| DE | 19606716 | C1 | 8/1997 |
| DE | 19630290 | A1 | 1/1998 |
| DE | 19731829 | A1 | 1/1999 |
| DE | 19743804 | A1 | 4/1999 |
| DE | 9422327 | U1 | 3/2000 |
| DE | 19852079 | A1 | 5/2000 |
| DE | 19936790 | A1 | 2/2001 |
| DE | 20017629 | U1 | 3/2001 |
| DE | 10048749 | A1 | 4/2002 |
| DE | 69429354 | T2 | 5/2002 |
| DE | 69622407 | T2 | 3/2003 |
| DE | 10307719 | A1 | 9/2003 |
| DE | 60001898 | T2 | 2/2004 |
| DE | 102004021223 | A1 | 12/2004 |
| DE | 10331206 | A1 | 1/2005 |
| DE | 102004034270 | A1 | 2/2006 |
| DE | 102004044655 | A1 | 3/2006 |
| DE | 102004049471 | A1 | 4/2006 |
| DE | 60212523 | T2 | 2/2007 |
| DE | 69836128 | T2 | 8/2007 |
| DE | 60125369 | T2 | 10/2007 |
| DE | 102006021623 | A1 | 11/2007 |
| DE | 102006056051 | A1 | 5/2008 |
| DE | 102007018877 | A1 | 10/2008 |
| DE | 60132100 | T2 | 12/2008 |
| DE | 102007037663 | A1 | 2/2009 |
| DE | 10 2008 018 881 | A1 | 9/2009 |
| DE | 102008053178 | A1 | 5/2010 |
| DE | 102009029946 | A1 | 12/2010 |
| DE | 102009038462 | A1 | 3/2011 |
| DE | 102010004496 | A1 | 7/2011 |
| DE | 102010019612 | A1 | 11/2011 |
| DE | 102012006371 | A1 | 7/2012 |
| DE | 102012005087 | A1 | 10/2012 |
| DE | 102012005650 | A1 | 9/2013 |
| DE | 102012212469 | A | 1/2014 |
| DE | 102012109123 | A1 | 3/2014 |
| DE | 202013101134 | U1 | 6/2014 |
| DE | 102013002412 | A1 | 8/2014 |
| DE | 102013011107 | A1 | 8/2014 |
| DE | 102013205171 | A1 | 9/2014 |
| DE | 102014006991 | A1 | 12/2014 |
| DE | 102014007523 | A1 | 11/2015 |
| DE | 102014008183 | A1 | 12/2015 |
| DE | 10 2014 217 892 | A1 | 3/2016 |
| DE | 102014012705 | A1 | 3/2016 |
| DE | 102014013158 | A1 | 3/2016 |
| DE | 10 2016 014 952 | A1 | 6/2018 |
| EP | 0138322 | A1 | 4/1985 |
| EP | 0297309 | A2 | 1/1989 |
| EP | 0665106 | A2 | 8/1995 |
| EP | 1120258 | A2 | 8/2001 |
| EP | 1270086 | A1 | 1/2003 |
| EP | 1764226 | A1 | 3/2007 |
| EP | 1852733 | A1 | 11/2007 |
| EP | 1884365 | A1 | 2/2008 |
| EP | 1946846 | A2 | 7/2008 |

(56) References Cited

FOREIGN PATENT DOCUMENTS

| | | | |
|---|---|---|---|
| EP | 2002898 | A1 | 12/2008 |
| EP | 2133154 | A2 | 12/2009 |
| EP | 2151282 | A1 | 2/2010 |
| EP | 2196267 | A2 | 6/2010 |
| EP | 2380744 | A2 | 10/2011 |
| EP | 2433716 | A1 | 3/2012 |
| EP | 2468512 | A1 | 6/2012 |
| EP | 2641661 | A1 | 9/2013 |
| EP | 2644392 | A2 | 10/2013 |
| EP | 2777938 | A1 | 9/2014 |
| EP | 2799150 | A1 | 11/2014 |
| EP | 2842753 | A1 | 3/2015 |
| EP | 3002128 | A2 | 4/2016 |
| EP | 3156138 | A1 | 4/2017 |
| EP | 3213823 | A1 | 9/2017 |
| EP | 3257590 | A1 | 12/2017 |
| EP | 3272669 | A1 | 1/2018 |
| EP | 3068626 | B1 | 10/2019 |
| FR | 3010918 | A1 | 3/2015 |
| GB | 2200433 | A | 8/1988 |
| GB | 2367771 | A | 4/2002 |
| GB | 2507069 | A | 4/2014 |
| JP | S5722070 | A | 2/1982 |
| JP | 862116442 | A | 5/1987 |
| JP | H04-106669 | U | 9/1992 |
| JP | H0798171 | B2 | 10/1995 |
| JP | H09192583 | A | 7/1997 |
| JP | 2000158670 | A | 6/2000 |
| JP | 2000317354 | A | 11/2000 |
| JP | 2001129456 | A | 5/2001 |
| JP | 2001157863 | A | 6/2001 |
| JP | 2001239652 | A | 9/2001 |
| JP | 2001300404 | A | 10/2001 |
| JP | 2005501745 | A | 1/2002 |
| JP | 2002361863 | A | 12/2002 |
| JP | 2003506210 | A | 2/2003 |
| JP | 2003136030 | A | 5/2003 |
| JP | 2003164780 | A | 6/2003 |
| JP | 2004142382 | A | 5/2004 |
| JP | 2004528956 | A | 9/2004 |
| JP | 2004337710 | A | 12/2004 |
| JP | 2005526234 | A | 9/2005 |
| JP | 2007021760 | A | 2/2007 |
| JP | 2007152666 | A | 6/2007 |
| JP | 2007520340 | A | 7/2007 |
| JP | 2007245633 | A | 9/2007 |
| JP | 2007289848 | A | 11/2007 |
| JP | 2008110332 | A | 5/2008 |
| JP | 2009006324 | A | 1/2009 |
| JP | 2010528852 | A | 8/2010 |
| JP | 2010531213 | A | 9/2010 |
| JP | 2010531729 | A | 9/2010 |
| JP | 2010241003 | A | 10/2010 |
| JP | 2011206958 | A | 10/2011 |
| JP | 2012011310 | A | 1/2012 |
| JP | 2012506305 | A | 3/2012 |
| JP | 2012135925 | A | 7/2012 |
| JP | 2012206116 | A | 10/2012 |
| JP | 2012228643 | A | 11/2012 |
| JP | 2012228660 | | 11/2012 |
| JP | 2013067179 | A | 4/2013 |
| JP | 2013530816 | A | 8/2013 |
| JP | 2013530816 | B2 | 8/2013 |
| JP | 2013188706 | A | 9/2013 |
| JP | 2014019140 | A | 2/2014 |
| JP | 2014050832 | A | 3/2014 |
| JP | 2014111307 | A | 6/2014 |
| JP | 2015-009222 | A | 1/2015 |
| JP | 2015027636 | A | 2/2015 |
| JP | 2015096322 | A | 5/2015 |
| JP | 2015520011 | A | 7/2015 |
| JP | 2015193129 | A | 11/2015 |
| JP | 2015535735 | A | 12/2015 |
| JP | 2016507372 | A | 3/2016 |
| JP | 2016526910 | A | 9/2016 |
| JP | 2016175077 | A | 10/2016 |
| JP | 2016175662 | A | 10/2016 |
| JP | 2018012065 | A | 1/2018 |
| JP | 2020513311 | A | 5/2020 |
| JP | 2020513314 | A | 5/2020 |
| WO | 8601775 | A1 | 3/1986 |
| WO | 9856585 | A1 | 12/1998 |
| WO | 02098576 | A1 | 12/2002 |
| WO | 03021519 | A1 | 3/2003 |
| WO | 2003062129 | A2 | 7/2003 |
| WO | 2004048112 | A1 | 6/2004 |
| WO | 2004085738 | A2 | 10/2004 |
| WO | 2005016556 | A1 | 2/2005 |
| WO | 2005075170 | A1 | 8/2005 |
| WO | 2006022217 | A1 | 3/2006 |
| WO | 2007121905 | A1 | 11/2007 |
| WO | 2009019036 | A1 | 2/2009 |
| WO | 2010046064 | A1 | 4/2010 |
| WO | 2010146473 | A1 | 12/2010 |
| WO | 2011044491 | A1 | 4/2011 |
| WO | 2011128439 | A1 | 10/2011 |
| WO | 2011138048 | A1 | 11/2011 |
| WO | 2013121565 | A1 | 8/2013 |
| WO | 2014121916 | A1 | 8/2014 |
| WO | 2015071270 | A1 | 5/2015 |
| WO | 2015096322 | A1 | 7/2015 |
| WO | 2015186014 | A1 | 12/2015 |
| WO | 2016-087016 | A1 | 6/2016 |
| WO | 2016142510 | A1 | 9/2016 |
| WO | 2016145000 | A1 | 9/2016 |
| WO | 2017006245 | A1 | 1/2017 |
| WO | 2017006246 | A1 | 1/2017 |
| WO | 2018102846 | | 6/2018 |
| WO | 2018108565 | A1 | 6/2018 |

OTHER PUBLICATIONS

Japenese Patent Office Notice of Reasons of Refusal for Application No. JP 2019-531967 mailed Jun. 8, 2021 (8 pages; with English machine translation).

Chinese Office Action and Search Report for CN201780077603.3 mailed Oct. 12, 2020 (15 pages; English translation not available).

Non Final Office Action mailed Nov. 23, 2021 for U.S. Appl. No. 16/468,694 (163 pages).

China National Intellectual Property Administration Office Action and Search Report for CN Application No. 201780077018.3 mailed Aug. 27, 2020 (11 pages; Search Report in English).

Notice of Allowance mailed in U.S. Appl. No. 16/468,689 on Jun. 2, 2021 (38 pages).

Chinese Office Action mailed Jun. 2, 2021 for Application No. CN201780077017.9 (17 pages; with English machine translation).

Japanese Notification of Reasons for Rejection mailed Jun. 1, 2021 for Application No. JP2019-531944 (14 pages; with English machine translation).

Japanese Notification of Reasons for Rejection mailed Jun. 8, 2021 for Application No. JP2019-531957 (13 pages; with English machine translation).

Supplemental Notice of Allowability mailed Jul. 8, 2021 for U.S. Appl. No. 16/468,696 (11 pages).

Liptak, Bela. (2006). Instrument Engineers' Handbook (4th Edition)—Process Control and Optimization, vol. 2—2.1.3.5 Process Time Constant, (pp. 99-102). Taylor & Francis. Retrieved from https://app.knovel.eom/hotlink/pdf/id:kt00CC7HL1/instrument-engineers/process-time-constant (Year: 2006).

Non-Final Office Action mailed Jan. 6, 2022 for related U.S. Appl. No. 16/468,701 (36 pages).

Notification of Reasons for Refusal for Application No. JP2019-532012 mailed Jun. 22, 2021 (6 pages; with English machine translation).

Notification of Reasons for Refusal for Application No. JP2019-527330 mailed Jun. 22, 2021 (10 pages; with English machine translation).

JPO Office Action for Application No. JP2019-531097 mailed Jun. 29, 2021 (10 pages; with English machine translation).

(56) References Cited

OTHER PUBLICATIONS

JPO Office Action for Application No. 2019-531096 mailed Jul. 6, 2021 (9 pages; with English machine translation).
JPO Office Action for Application No. 2019-531098 mailed Jul. 6, 2021 (5 pages; English translation only).
JPO Office Action for Application No. 2019-531459 mailed Jul. 6, 2021 (8 pages; with English machine translation).
Fianl Office Action mailed May 13, 2021 for USPA No. U.S. Appl. No. 16/468,691 (70 pages).
Non-Final Office Action mailed on Apr. 28, 2021 for U.S. Appl. No. 16/468,693 (109 pages).
Final Office Action mailed on Apr. 19, 2021 for U.S. Appl. No. 16/468,700 (62 pages).
JPO Decision to Grant in related application JP2019-532012 mailed Jan. 25, 2022 (6 pages; with English machine translation).
EPO Official Notification of Opposition for Application No. 17821803.8 mailed Feb. 10, 2021 (64 pages; with English machine translation).
JPO Decision to Grant in related application No. JP2019-532030 mailed Dec. 1, 2022 (6 pages; English machine translation provided).
Non-Final Office Action mailed Feb. 5, 2021 for U.S. Appl. No. 16/468,701 (80 pages).
Non-Final Office Action mailed Feb. 18, 2021 for U.S. Appl. No. 16/468,692 (97 pages).
JPO Notification of Reasons for Rejection for Application No. JP2019-532030 mailed May 18, 2021 (6 pages; with English translation).
CIPO Office Action for Application No. CN201780077474.8 mailed Apr. 26, 2021 (17 pages; with English translation).
Non-Final Office Action mailed Dec. 24, 2021 for related U.S. Appl. No. 16/468,693 (19 pages).
European Search Report for EP20170638.9 mailed Sep. 14, 2020 (4 pages—English translation not available).
European Search Report for EP20170021.8 mailed Sep. 8, 2020 (11 pages—English translation not available).
European Search Report for EP20170025.9 mailed Sep. 9, 2020 (4 pages—English translation not available).
European Search Report for EP20170016.8 mailed Sep. 7, 2020 (4 pages—English translation not available).
JPO Submission for JP2019-531096; submitted Dec. 21, 2020 (32 pages; with English translation).
JPO Submission for JP2019-531957; submitted Dec. 21, 2020 (21 pages; with English translation).
Non-Final Office Action for U.S. Appl. No. 16/468,691 mailed Jan. 7, 2021 (79 pages).
Chinese Office Action for Application No. CN20178007017.9 mailed on Aug. 31, 2020 (8 pages; with English translation).
Non Final Office Action for U.S. Appl. No. 16/468,697 mailed Oct. 22, 2020 (78 pages).
Non Final Office Action for U.S. Appl. No. 16/468,696 mailed Nov. 2, 2020 (58 pages).
Non Final Office Action for U.S. Appl. No. 16/468,689 mailed Oct. 15, 2020 (77 pages).
Chinese Office Action for CN201780077476.7 mailed Sep. 23, 2020 (12 pages; English translation not available).
Non Final Office Action for U.S. Appl. No. 16/468,700 mailed Dec. 1, 2020 (73 pages).
JPO Decision to Grant mailed Oct. 3, 2021 for Application No. JP2019-532113 (7 pages; with English machine translation).
Final Office Action mailed Oct. 7, 2021 for U.S. Appl. No. 16/468,693 (58 pages).
JPO Office Action mailed Jul. 3, 2021 for Application No. JP2019-532024 (12 pages; with English machine translation).
Non-Final Office Action mailed Aug. 27, 2021 for U.S. Appl. No. 16/468,695 (149 pages).
Ghasem, G. et al; "Chapter 2 Background on Sprays and Their Production", Industrial Sprays and Atomization: Design, Analysis and Applications, Jan. 1, 2002, Springer, London, pp. 7-33, XP009195118, ISBN: 978-1-4471-3816-7.
International Search Report and Written Opinion for PCT/EP2017/081141 mailed Feb. 26, 2018 (17 pages; with English translation).
International Search Report and Written Opinion for PCT/EP2017/081114 mailed May 15, 2018 (33 pages; with English translation).
Anonymous: "Roboterkalibrierung—Wikipedia", Nov. 7, 2016, XP055471615, Gefunden im Internet: URL: https://de.wikipedia.org/w/index.php?title=Roboterkalibrierung&oldid=159460756 [gefunden am Apr. 30, 2018] das ganze dockument (8 pages; with English translation).
Beyer, Lukas: "Genauigkeitssteigerung von Industrierobotern", Forschungsberichte Aus Dem Laboratorium Fertigungstechnik/Helmut-Schmidt-Universitat, Universitat Der Bundeswehr Hamburg, Dec. 31, 2005, Seiten 1-4, XP009505118; ISSN: 1860-2886; ISBN: 978-3-8322-3681-6 (13 pages; with English machine translation).
International Search Report and Written Opinion for PCT/EP2017/081108 mailed Feb. 28, 2018 (with English translation; 18 pages).
International Search Report and Written Opinion for PCT/EP2017/081099 mailed Feb. 26, 2018 (21 pages; with English translation).
International Search Report and Written Opinion for PCT/EP2017/081102 mailed Mar. 14, 2018 (16 pages; with English translation).
International Search Report and Written Opinion for PCT/EP2017/081105 mailed Feb. 26, 2018 (19 pages; with English translation).
International Search Report and Written Opinion for PCT/EP2017/081152 mailed May 15, 2018 (25 pages; with English translation).
International Search Report and Written Opinion for PCT/EP2017/081098 mailed May 14, 2018 (26 pages; with English translation).
International Search Report and Written Opinion for PCT/EP2017/081101 mailed Feb. 28, 2018 (14 pages; with English translation).
International Search Report and Written Opinion for PCT/EP2017/081121 mailed Feb. 26, 2018 (20 pages; with English translation).
International Search Report and Written Opinion for PCT/EP2017/081117 mailed Mar. 12, 2018 (27 pages; with English translation).
International Search Report and Written Opinion for PCT/EP2017/081123 mailed on Feb. 26, 2018 (20 pages; with English translation).
Final Office Action mailed Jun. 11, 2021 for U.S. Appl. No. 16/468,701 (53 pages).
EPO Examination Report for Application No. 201702818.1 mailed Dec. 18, 2020 (with English machine translation; 6 pages).
EPO Notification of Objection mailed May 18, 2022 for Patent No. EP3718643, related to related U.S. Appl. No. 16/468,693 (55 pages; with English machine translation).
USPTO Non-Final Office Action in related U.S. Appl. No. 17/532,411 mailed Jan. 13, 2023 (127 pages).
Chinese Office Action in related application No. CN201780077045.0 mailed Jan. 29, 2022 (17 pages; English machine translation provided).
Huo Lijiang, "Packaging Printing Technology", 1st edition, pp. 321-323, Printing Industry Press, Sep. 30, 2011 (10 pages; with English machine translation).
Chinese Patent Office—Office Action for Application No. CN202211512023.1 mailed Aug. 16, 2023 (26 pages; with English machine translation).
USPTO Non-Final Office Action mailed Jun. 23, 2023 for related U.S. Appl. No. 17/740,537 (107 pages).
USPTO Non-Final Office Action mailed Jun. 26, 2023 for related U.S. Appl. No. 17/965,062 (85 pages).

* cited by examiner

PRINT HEAD WITH A DISPLACING MECHANISM FOR A NOZZLE ROW

CROSS-REFERENCE TO RELATED APPLICATIONS

This application is a national stage of, and claims priority to, Patent Cooperation Treaty Application No. PCT/EP2017/081121, filed on Dec. 1, 2017, which application claims priority to German Application No. DE 10 2016 014 920.5, filed on Dec. 14, 2016, which applications are hereby incorporated herein by reference in their entireties.

BACKGROUND

The disclosure relates to an application device for the application of an application medium onto a component, preferably for application of a paint onto a motor vehicle body component, having at least two nozzle rows, wherein the at least two nozzle rows have in each case several nozzles for the output of application medium jets (e.g. continuous application medium jets and/or droplet jets comprising several droplets).

With regard to the general prior art, reference can initially be made to DE 10 2014 006 991 A1, US 2005/0 243 112 A1, EP 1 764 226 A1 and EP 1 852 733 A1.

Rotary atomisers are normally used as the application device for series painting of motor vehicle body components, which rotary atomisers have, however, the disadvantage of a limited degree of application efficiency so that only a part of the applied paint is deposited on the components to be coated, while the rest of the applied paint must be disposed of as so-called overspray.

U.S. Pat. No. 9,108,424 B2 discloses a drop-on-demand valve-jet printer with several valve openings (nozzles), the mode of action of which is based on the use of electric valves. Here, in each case a magnetic piston is guided in a coil and lifted up by the supply of current into the coil. In particular, the area outputs required in the automated series painting of high-value components, e.g. motor vehicle bodies, cannot usually be achieved by drop-on-demand printing techniques. The term print head can therefore also be replaced by the term nozzle applicator. It is apparent from FIG. 17 that above all the distances between the nozzles are too large in order to coat the entire surface, in particular to generate a continuous coating medium film.

One problem is that the individual nozzles of a nozzle row cannot currently mechanically be manufactured to be as narrow as desired, in particular if single valves are installed, as is normal e.g. in the case of drop-on-demand valve-jet printers because required distances between nozzles, coils, actuating lever, armatures, etc. lead to a minimum distance between the individual nozzles. The minimum distances can be so large that one nozzle row on its own does not lead to a closed coating medium film. By rotating the print head, as already stated above, under certain circumstances, a closed coating medium film can be achieved, but the track width is nevertheless also significantly reduced by the rotation, which leads to a reduced area output.

One measure to increase the area output seems initially that several print heads are arranged behind one another and are arranged offset with respect to one another in the longitudinal direction of the nozzle rows.

Such an arrangement would, however, be disadvantageous in particular in the case of the application robot-based painting of motor vehicle bodies because a joint rotation of the print heads required e.g. depending on the component geometry about a joint central axis by the application robot leads to uneven nozzle distances between the nozzles of the individual nozzle rows, which can be inferred from FIG. 19.

It can be inferred from FIG. 20 that uneven nozzle distance between the nozzles of the nozzle rows leads to a non-homogeneous, in the extreme case even not closed, coating medium film, which is usually unacceptable e.g. in motor vehicle painting technology.

DETAILED DESCRIPTION

Figure 1:
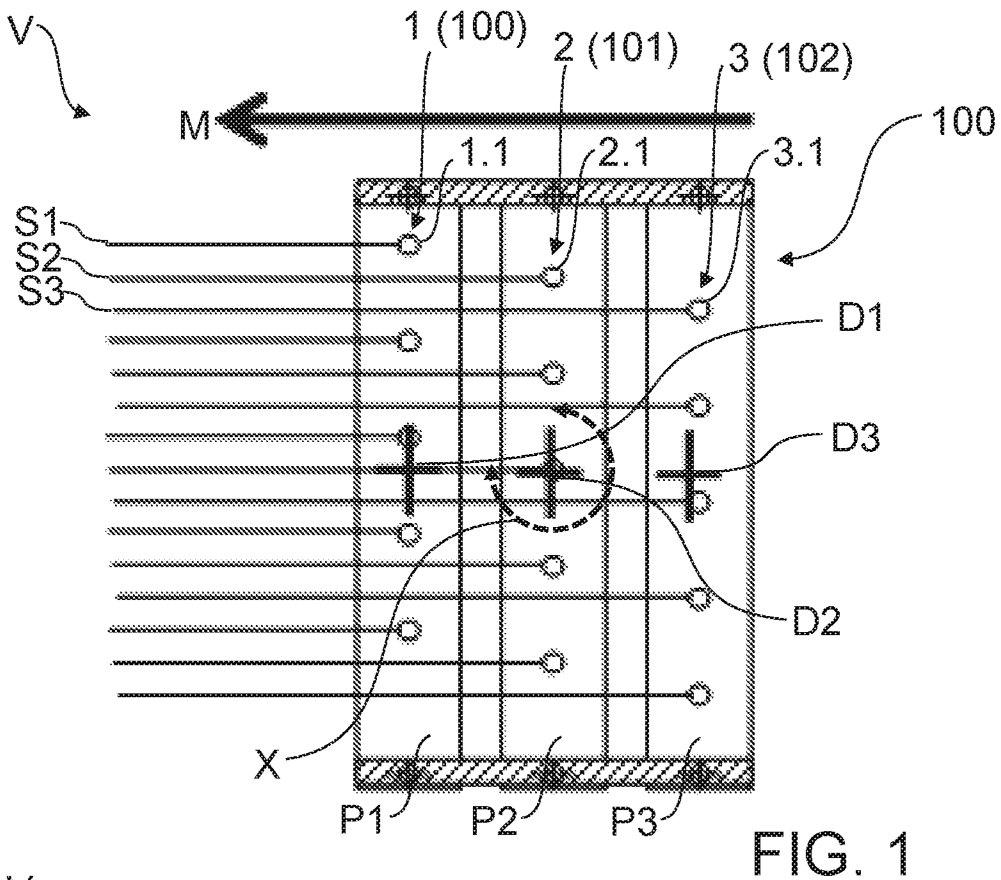
FIG. 1 shows a schematic view of three nozzle rows for an application device according to one example of the disclosure.

The disclosure relates to an application device for application of an application medium onto a component, preferably for the application of a paint onto a motor vehicle body component.

The application device includes at least one print head for application of the application medium preferably in series and e.g. for mounting on an application robot. The at least one print head can include e.g. a first print head and at least one further print head.

The application device includes at least two nozzle rows, which are preferably movable, in particularly jointly movable, by the application robot.

The at least two nozzle rows include a first nozzle row with several nozzles for the output of application medium jets (e.g. continuous application medium jets and/or droplet jets comprising droplets) and at least one further nozzle row with several nozzles for the output of application medium jets (e.g. continuous application medium jets and/or droplet jets comprising droplets). The application device can thus have in particular at least two, at least three, at least four or even at least five nozzle rows.

The application device is characterised in particular in that at least one nozzle row of the at least two nozzle rows is movable, for the purpose of position adjustment, in particular position correction, of the nozzles of the first nozzle row and the nozzles of the at least one further nozzle row. The first nozzle row and/or the at least one further nozzle row can thus be movable. The application device can consequently include, for the purpose of position adjustment, at least one, at least two, at least three or even at least five movable nozzle rows.

The position adjustment serves in particular to correct a rotation of the at least two nozzle rows caused by the application robot, in particular its wrist axis.

The rotation of the at least two nozzle rows is carried out e.g. about a rotational axis perpendicular to the component.

The disclosure creates an expedient technical/mechanical solution by means of which it can be ensured that several nozzle rows can be used and the several nozzle rows can be rotated in particular jointly by an application robot, wherein an incorrect position resulting from the rotation can be corrected by the position adjustment in the context of the disclosure.

The application device according to the disclosure includes in particular examples in which a position adjustment of individual nozzle rows (e.g. on a print head) and/or individual print heads to one another are enabled in order to correct the position of the at least two nozzle rows so that a furthermore substantially homogeneous application image can be maintained evenly with preferably all the nozzle distances, jet distances and/or droplet tracks. Substantially all the jet distances can become narrower or wider as a result of the rotation caused by the application robot, but all the distances preferably remain substantially evenly spaced apart as a result of the position adjustment (correction) of the nozzle rows.

The rotation of the at least two nozzle rows caused by the application robot is preferably carried out about an axis of rotation which is arranged substantially centrally relative to the at least two nozzle rows and/or is oriented substantially parallel to the application medium jets of the at least two nozzle rows, which encompasses e.g. a rotation about the Z-axis (or another axis) in the case of horizontal painting.

The at least one print head corresponds to an applicator for preferably serial application of the application medium and for mounting on an application robot. The term applicator used herein can include one or more print heads.

For optimum application with one or more print heads with individual nozzles which are arranged in a row, the position adjustment of the nozzle rows is useful or even necessary for e.g. one of the following functions. The application device thus includes one or more of the following advantageous properties:

- Uniform change in the nozzle distances,
- Adjustment to obtain a homogeneous paint image (substantially all of the individual rows join/run to form a homogeneous painting strip/paint film),
- Suitable for various paint systems,
- Suitable for various paints,
- Suitable for various paint suppliers,
- Suitable for various colours,
- Suitable for various viscosities,
- For balancing out production fluctuations and/or tolerances of the components,
- For adjustment to a component geometry,
- Width adjustment of the paint jet/paint strip to the geometry of the component,
- Adjustment of the jet width of the applicator,
- Adjustment to change the layer thickness,
- Adjustment to change the application time(s),
- Adjustment to improve the running of the paint,
- Adjustment to change the area output,
- High area output,
- Possibility of rotating the applicator about its central or rotational axis without impairing the homogeneity of the paint film,
- Rotation/displacement of at least one nozzle row in order to adjust or maintain the homogeneity of the paint film, e.g. for various paint types, paints, viscosities, etc.,
- Rotation/displacement of at least one nozzle row in order to follow contours of the component,
- Rotation/displacement of at least one nozzle row in order to change the painting jet width/strip width,
- Enabling larger valves (easier to produce and/or with a higher closing force) for control of the application medium output,
- Multi-row nature and position adjustment (correction mechanism) enable full range of use/parameters of the applicator in terms of rotation and area output.

It is possible that the at least one movable nozzle row is movable in order to correct a rotation, which can be generated by the application robot, of the at least two nozzle rows so that the nozzle distances between the nozzles, and thus expediently the application medium jets, of the first nozzle row and the nozzles, and thus expediently the application medium jets, of the at least one further nozzle row are spaced apart substantially evenly from one another.

It is alternatively or additionally possible that, as a result of a rotation, which can be generated by the application robot, of the at least two nozzle rows, the expediently changeable nozzle distances between the nozzles, and thus expediently the application medium jets, of the first nozzle row, and the nozzles, and thus expediently the application medium jets, of the at least one further nozzle row become larger or smaller, but are substantially evenly spaced apart from one another as a result of the position adjustment.

Figure 19:
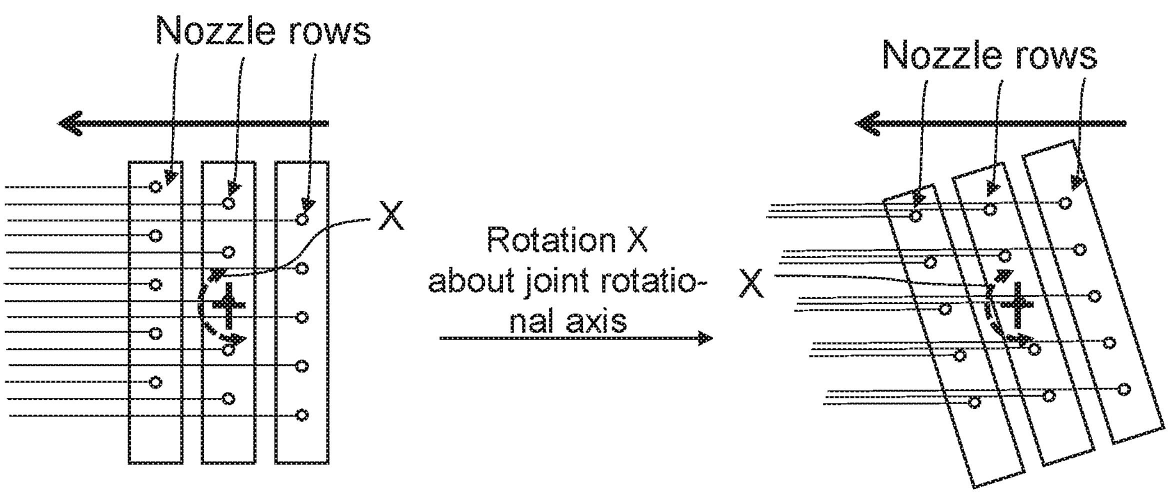
FIGS. 19 and 20 show schematic views in order to illustrate a problem if several print heads arranged behind one another are rotated by an application robot.

The position adjustment preferably enables a relative movement between the at least two nozzle rows, e.g. in contrast to the variant shown in FIG. 19, in which the nozzle rows are all rotated about a single central axis without a relative movement function.

The rotation, which can be generated by the application robot, of the at least nozzle rows can be carried out e.g. about a common rotational axis and preferably by a wrist axis of the application robot.

Despite a rotation, which can be generated by the application robot, of the at least two nozzle rows, the position adjustment can preferably enable substantially uniform nozzle distances between the nozzles of the first nozzle row and the nozzles of the at least one further nozzle row.

Alternatively or additionally, e.g. despite a rotation, which can be generated by the application robot, of the at least two nozzle rows, the position adjustment can enable a maintenance of homogeneity, which is sufficient in particular for motor vehicle painting, of the application medium films which can be generated by the application medium on the component.

The nozzle distances correspond e.g. to nozzle distances perpendicular to the preferably translational movement direction of the at least one print head.

The rotation of the at least two nozzle rows is preferably carried out by one axis of the wrist axis of the application robot.

It is important here that the device for position adjustment of the at least two nozzle rows is supported at a point of the axis of rotation or the wrist axis which is not influenced by the rotational movement.

The at least one movable nozzle row is preferably movable in addition to the movement with the application robot.

It is possible that the at least one movable nozzle row is rotatable and has an axis of rotation.

The axis of rotation can be positioned e.g. substantially centrally with respect to the at least one movable nozzle row, in particular in its longitudinal and/or transverse direction, or eccentrically with respect to the at least one movable nozzle row, in particular in its longitudinal and/or transverse direction.

It is possible that the axis of rotation is positioned e.g. on the longitudinal axis of the movable nozzle row and/or outside or inside the at least one movable nozzle row. It is possible that several nozzle rows are rotatable and have in each case their own axis of rotation.

The individual axes of rotation can be e.g. evenly spaced apart from one another and/or arranged in a preferably linear row.

The at least one movable nozzle row can preferably be longitudinally displaceable along its longitudinal extent and indeed as an alternative or in addition to a rotatability function.

It is possible that the application device includes a displacing and/or rotating mechanism for expediently direct or indirect movement of the at least one movable nozzle row.

It is possible, as mentioned above, that the first nozzle row and/or the at least one further nozzle row is/are movable for the purpose of position adjustment of the nozzles of the first nozzle row and the nozzles of the at least one further nozzle row.

It is possible that the application device, for the purpose of position adjustment, includes at least one motor, preferably electric motor, for expediently direct or indirect movement of the at least one movable nozzle row.

The at least one motor can include e.g. a sliding/linear motor, rotary motor and/or servo motor.

It is possible that one and the same motor serves the purpose of expediently direct or indirect joint movement of the first nozzle row and the at least one further nozzle row so that, for the purpose of position adjustment, the first nozzle row and the at least one further nozzle row are movable. In this case, a motor can therefore be used to move at least two nozzle rows.

It is also possible that a first motor serves to move the first nozzle row and at least one further motor serves to move the at least one further nozzle row so that, for the purpose of position adjustment, the first nozzle row and the at least one further nozzle row are movable. In this case, single motors can therefore be used to move at least two nozzle rows.

It is possible that, for the purpose of position adjustment, the first nozzle row and the at least one further nozzle row are connected to one another via at least one connection, preferably a master/slave connection and/or a mechanical coupling connection. As a result of this, e.g. a synchronisation of the movements of the first nozzle row and the at least one further nozzle row can be brought about. Alternatively or additionally, it can be brought about that a movement of the first nozzle row causes a corresponding movement of the at least one further nozzle row or vice versa.

The first nozzle row and the at least one further nozzle row can also be actuated individually for the purpose of position adjustment.

The application device can, for the purpose of position adjustment, have at least one of the following: at least one parallelogram mechanism (e.g. connection of the print heads and/or nozzle rows to supported webs and displacement resulting from this), at least one contour curve, at least one cam disc, at least one transmission apparatus, preferably with axles, and/or at least one involute toothing (e.g. involute transmission).

The application device can include at least one control apparatus for calculating adjustment values for the position adjustment and preferably serve to control the movements of the at least one movable nozzle row and/or for control of the application robot. The motor of the handling device (robot) transfers the position data to software which generates from it correction commands for the correction motor(s).

It is possible that the at least one movable nozzle row is fitted on a print head as disclosed herein.

For the purpose of position adjustment, the at least one movable nozzle row can be movable e.g. relative to its print head.

For the purpose of position adjustment, the at least one movable nozzle row can, however, also be movable e.g. jointly with its print head so that the at least one movable nozzle row is preferably arranged in a stationary manner relative to its print head and/or the movement of the at least one movable nozzle row is caused by a movement of its print head.

In the context of the disclosure, therefore at least one movable nozzle row can be movable relative to the print head, on which it is mounted, for the purpose of position adjustment. Alternatively or additionally, in the context of the disclosure, at least one movable nozzle row can also, however, be movable together with the print head, on which it is mounted, for the purpose of position adjustment.

The first nozzle row and the at least one further nozzle row can be arranged e.g. on one and the same print head and movable relative to its print head.

The application device can have a first print head as disclosed herein and at least one further print head as disclosed herein.

The first print head can preferably include the first nozzle row and the at least one further print head can include the at least one further nozzle row.

It is possible that the first nozzle row is movable relative to the first print head. Alternatively, the first nozzle row can be jointly movable with the first print head so that e.g. the first nozzle row is arranged in a stationary manner relative to the first print head and/or the movement of the first nozzle row is caused by a movement of the first print head.

It is possible that the at least one further nozzle row is arranged to be movable relative to the at least one further print head. Alternatively, the at least one further nozzle row can be jointly movable with the at least one further print head so that e.g. the at least one further nozzle row is arranged in a stationary manner relative to the at least one further print head and/or the movement of the at least one further nozzle row is caused by a movement of the at least one further print head.

The first print head and/or the at least one further print head can have at least one nozzle row, preferably, however, at least two e.g. movable nozzle rows.

The first print head and the at least one further print head can be held e.g. by a holder apparatus and form in particular a multiple print head unit.

The first print head and the at least one further print head serve in particular the purpose of mounting on one and the same application robot.

The holder apparatus, for the purpose of position adjustment, can enable an e.g. translational and/or rotational degree of freedom of movement for the first print head and/or for the at least one further print head.

It is possible that the first nozzle row and the at least one further nozzle row are offset with respect to one another in their longitudinal direction and/or the nozzles of the first nozzle row and the nozzles of the at least one further nozzle row do not overlap.

The first nozzle row and the at least one further nozzle row can e.g. be arranged behind one another offset orthogonally with respect to their longitudinal direction and/or substantially orthogonal for the expediently translational direction of movement of the at least one print head.

It is possible that the first nozzle row and the at least one further nozzle row remain oriented substantially parallel to one another despite position adjustment, i.e. are oriented parallel to one another in particular before and after a position adjustment.

It is possible that the first nozzle row is arranged in a first nozzle plate and the at least one further nozzle row is arranged in a separate second nozzle plate, preferably spaced apart from the nozzle plate of the first nozzle row.

It is possible that single valves for control of the application medium output from the individual nozzles of the first nozzle row and/or the individual nozzles of the at least one further nozzle row are provided, wherein the single valves have in each case a movable valve element (e.g. armature or valve needle) in order to close the respective nozzle in a closing position and release it in an opening position, and have in each case a preferably electromechanical drive, preferably a coil/restoring element drive, for movement of the valve element. The single valves are expediently arranged in the at least one print head.

The valve drives preferably operate electromechanically (e.g. electromagnetically or piezoelectrically).

The valve drives include in each case preferably an electric coil or a piezo-actuator for actuation of the valve element.

It is possible that the valve drives include in each case a preferably elastic restoring element for actuation of the valve element.

The application medium jets of the first nozzle row and/or the at least one further nozzle row can include continuous application medium jets and/or droplet jets (comprising several e.g. substantially round or elongated droplets).

In order to generate a droplet jet, e.g. the coil and the restoring element (e.g. a spring) can ensure that the valve element is moved to and fro between the opening position and the closing position. The droplet jet is expediently present between the at least one nozzle and the component.

In order to generate a continuous application medium jet, e.g. the coil or the piezo-actuator can retain the valve element permanently in the opening position. The restoring element can move e.g. the valve element in idle phases into the closing position, wherein, during application of the applications medium, the valve element is expediently retained permanently in the opening position. The continuous application medium jet is expediently present between the at least one nozzle and the component.

The application medium can be e.g. viscous, highly viscous or structurally viscous, preferably with a viscosity of more than 15 mPas, more than 30 mPas, more than 60 mPas, more than 100 mPas or more than 130 mPas and/or preferably with a viscosity of less than 400 mPas or less than 200 mPas or less than 150 mPas (measured at a shear rate of 1000 $s^{-1}$) and/or a paint.

The at least one print head can expediently include the print head and/or the at least one further print head.

The at least one print head may have at least one of the following features:

- the at least one print head is embodied for substantially atomisation- or spray mist-free application of the application medium, and/or
- the at least one print head is configured for long-term operation and serves to surface area-coat the component, and/or
- the at least one print head outputs a narrowly restricted application medium jet in contrast to a spray mist (atomised, such as generated e.g. by an atomiser), and/or the at least one print head outputs a droplet jet, e.g. in contrast to an application medium jet which is continuous in the longitudinal direction of the jet. In this case, it should be mentioned that the droplets of the print head do not generate an overspray for the following reasons:
  1) They are targeted and therefore strike the surface.
  2) They are not deflected by air.
  3) They are not deflected by electrostatic, and/or
- the at least one print head outputs an application medium jet which is continuous in the longitudinal direction of the jet, e.g. in contrast to a droplet jet.
- the at least one print head has an application efficiency of at least 80%, 90%, 95% or 99% so that substantially the entire applied application medium is preferably fully deposited on the component, substantially without overspray generation, and/or
- the above applies in relation to the area which is supposed to be painted. It can arise at short angular transitions (edges) according to what is desired that the vertical parts of the angled sheets should be painted. However, this leads to regions during switching off/on or at edges which are partially painted, but should not actually be painted. This reduces the "efficiency". This, however, does not involve overspray, but rather partial surfaces which are coated where undesired in order to ensure that the desired surfaces are fully wetted with paint, and/or the at least one print head has a surface coating output of at least 0.5 $m^2$/min, 1 $m^2$/min, 2 $m^2$/min or at least 3 $m^2$/min, and/or the at least one print head has at least one electrically actuable actuator in order to output the application medium from the at least one print head, in particular a magnetic actuator or a piezo-actuator.

It should be mentioned that the first nozzle row and/or the at least one further nozzle row can include a plurality of nozzles (e.g. more than 5, more than 10 or even more than 15 nozzles and optionally a corresponding number of associated individual valves).

It should furthermore be mentioned that the term used in the context of the disclosure of the at least one "print head" is to be understood generally and merely serves the purpose of delimiting atomisers (e.g. rotation atomisers, disc atomisers, airless atomisers, airmix atomisers and/or ultrasound atomisers) which generate a spray mist of the application medium to be applied. In contrast to this, the print head according to the disclosure generates preferably at least one, in particular a plurality of spatially narrowly restricted application medium jets.

It should furthermore be mentioned that the at least two nozzle rows preferably serve to apply a paint (e.g. base coat, clear coat, water-based paint and/or solvent-based paint). However, they can alternatively also be configured for the application of other application media, in particular coating media, such as, for example, for the application of sealant, insulant, adhesive, primer, etc., just to mention a few examples.

The application distance between the nozzles and the component surface is preferably at least 4 mm, 10 mm, 20 mm or 40 mm and/or at most 200 mm or 100 mm.

The disclosure also can include an application robot, preferably a coating or painting robot, with at least one application device as disclosed herein.

The application robot expediently serves to guide one or more print heads and thus the at least two nozzle rows and can have e.g. at least five or at least six movable robot axes.

The disclosure also comprises an application method, preferably carried out by an application device as disclosed herein.

The application method serves to apply an application medium onto a component, preferably to apply a paint onto a motor vehicle body component, wherein at least one print head applies the application medium preferably in series and is mounted on an application robot, and at least two nozzle rows are moved by the application robot, wherein the at least two nozzle rows include a first nozzle row with several nozzles for the output of application medium jets and at least one further nozzle row with several nozzles for the output of application medium jets.

The application method is above all characterised in that at least one nozzle row of the at least two nozzle rows is moved for the purpose of position adjustment of the nozzles of the first nozzle row and the nozzles of the at least one further nozzle row.

The preferred examples of the disclosure described with reference to the figures partially correspond, wherein similar or identical parts are provided with the same reference signs, and for the explanation of which reference is also made to the description of other examples or figures in order to avoid repetitions.

For the sake of clarity, only in each case one nozzle, only one associated application medium jet and only a few nozzle distances are usually provided with reference signs in the figures.

Figure 2:
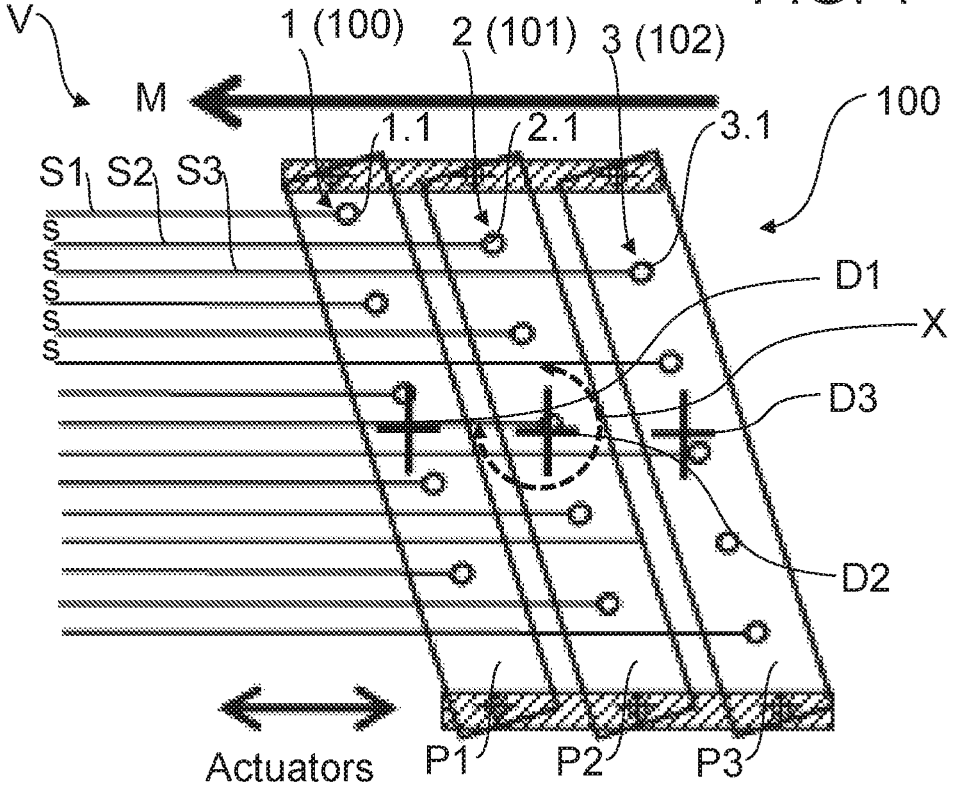
FIG. 2 shows a schematic view of the three nozzle rows of FIG. 1 in a position-adjusted location.

FIG. 1 shows a schematic view of three nozzle rows 1, 2 and 3 for an application device V according to one example of the disclosure, wherein FIG. 2 shows an associated schematic view of three nozzle rows 1, 2, 3 in a position rotated for position adjustment. Application device V is described below with joint reference to FIGS. 1 and 2.

Application device V serves to apply an application medium onto a component, preferably for application of a paint onto a motor vehicle body component.

Application device V includes a print head 100 for serial and atomisation-free and thus in particular substantially overspray-free application of the application medium. Print head 100 serves the purpose of mounting on an application robot.

Print head 100 includes three nozzle rows 1, 2, 3 which can be moved by the application robot.

A first nozzle row 1 is incorporated into a first nozzle plate P1 and includes five nozzles 1.1 for the output of application medium jets S1.

A second nozzle row 2 is incorporated into a second nozzle plate P2 and includes five nozzles 2.1 for the output of application medium jets S2.

A third nozzle row 3 is incorporated into a third nozzle plate P3 and includes five nozzles 3.1 for the output of application medium jets S3.

Reference sign M designates the expediently translational direction of movement of print head 100 and thus of nozzle rows 1, 2, 3.

The three nozzle rows 1, 2, 3 are fitted on one and the same print head 100.

During an application process, it is normally necessary that print head 100 and thus nozzle rows 1, 2, 3 have to be rotated e.g. depending on the component geometry about a joint rotational axis, which is indicated in FIGS. 1 and 2 by rotary arrow X. Rotation X is normally carried out by a wrist axis of the application robot and preferably about a rotational axis substantially perpendicular to the component, supported on the robot.

The "geometry" can also be generated by switching on or off. However, "steps" in the size of the nozzle distance in the paint are then visible. If this is not acceptable or good enough for the optical solution for the painted part, only rotation then remains as a solution.

A rotation X of print head 100 together with nozzle rows 1, 2, 3, without the position adjustment explained later, would lead to a nozzle row positioning similar to e.g. as shown on the right in FIG. 19, which in turn would lead to a non-homogeneous paint film as shown e.g. at the bottom in FIG. 20. A non-homogeneous paint image is unacceptable in particular in the region of the motor vehicle painting.

The at least three nozzle rows 1, 2, 3 are thus movable in order to enable a position adjustment of nozzles 1.1 of first nozzle row 1, nozzles 2.1 of second nozzle row 2 and nozzles 3.1 of third nozzle row 3. The position adjustment allows, in contrast to the example shown e.g. in FIG. 19, in particular a relative movement between three nozzle rows 1, 2, 3.

The movability function of the three nozzle rows 1, 2, 3 makes it possible for a rotation X of the three nozzle rows 1, 2, 3 generated by the application robot to be corrected so that the changeable nozzle distances S between nozzles 1.1 of first nozzle row 1, nozzles 2.1 of second nozzle row 2 and nozzles 3.1 of third nozzle row 3 become evenly spaced apart from one another.

Nozzle distances S correspond to the nozzle distances perpendicular to translational direction of movement M of print head 100.

It indeed follows from rotation X that nozzle distances S between nozzles 1.1, nozzles 2.1 and nozzles 3.1 can become larger or smaller. They can, however, nevertheless be kept evenly spaced apart from one another by the position adjustment.

Despite a rotation X generated by the application robot, the position adjustment enables even nozzle distances S between nozzles 1.1 of first nozzle row 1, nozzles 2.1 of second nozzle row 2 and nozzles 3.1 of third nozzle row 3.

Despite rotation X, the position adjustment enables maintenance of homogeneity of the application medium film on the component generated by the application medium.

The three nozzle plates P1, P2, P3 including associated nozzle rows 1, 2, 3 are rotatable for the purpose of position adjustment.

First nozzle row 1 is thus rotatable about a first axis of rotation D1 arranged centrally with respect to first nozzle row 1. Second nozzle row 2 is rotatable about a second axis of rotation D2 arranged centrally with respect to second nozzle row 2. Third nozzle row 3 is rotatable about a third axis of rotation D3 arranged centrally with respect to third nozzle row 3. The three axes of rotation D1, D2, D3 are evenly spaced apart from one another and arranged in a row.

The three nozzle rows 1, 2, 3 are connected to one another via a parallelogram mechanism for the purpose of position adjustment and/or as a guide mechanism, which parallelogram mechanism furthermore ensures a synchronised and thus even movement of nozzle plates P1, P2, P3 and thus of nozzle rows 1, 2, 3.

A control, e.g. robot control software, could, depending on the angle of rotation, calculate and correspondingly correct the paint impact points on the surface so that the existing track data are correspondingly recalculated, i.e. a correction of the displacement of the paint impact points and a correction of the tracks since the track width changes. This leads to more or fewer tracks which can be automatically corrected or even generated. This applies to any type of rotation. Also in the case of only one nozzle row.

The three nozzle rows 1, 2, 3 can, as already mentioned, be fitted on one and the same print head 100. Nevertheless, another example is also possible which is represented by the reference signs in brackets in FIGS. 1 and 2.

E.g. first nozzle row 1 can thus be fitted on a first print head 100. Second nozzle row 2 can be fitted on a second print head 101. Third nozzle row 3 can be fitted on a third print head 102.

The following variants are possible individually or in combination with one another in order to achieve the movability function and/or position adjustment:

Respective nozzle row 1, 2, 3 is movable relative to its print head 100, 101, 102.

Respective nozzle row 1, 2, 3 is jointly movable with its print head 100, 101, 102 so that respective nozzle row 1, 2, 3 is arranged in a stationary manner relative to its print head 100, 101, 102 and the movement of respective nozzle row 1, 2, 3 is caused by a movement of its print head 100, 101, 102.

It is consequently apparent that, in the context of the disclosure, for the purpose of position adjustment, at least one nozzle row can expediently be movable relative to its print head and/or at least one nozzle row can be movable jointly with its print head.

Figure 3:
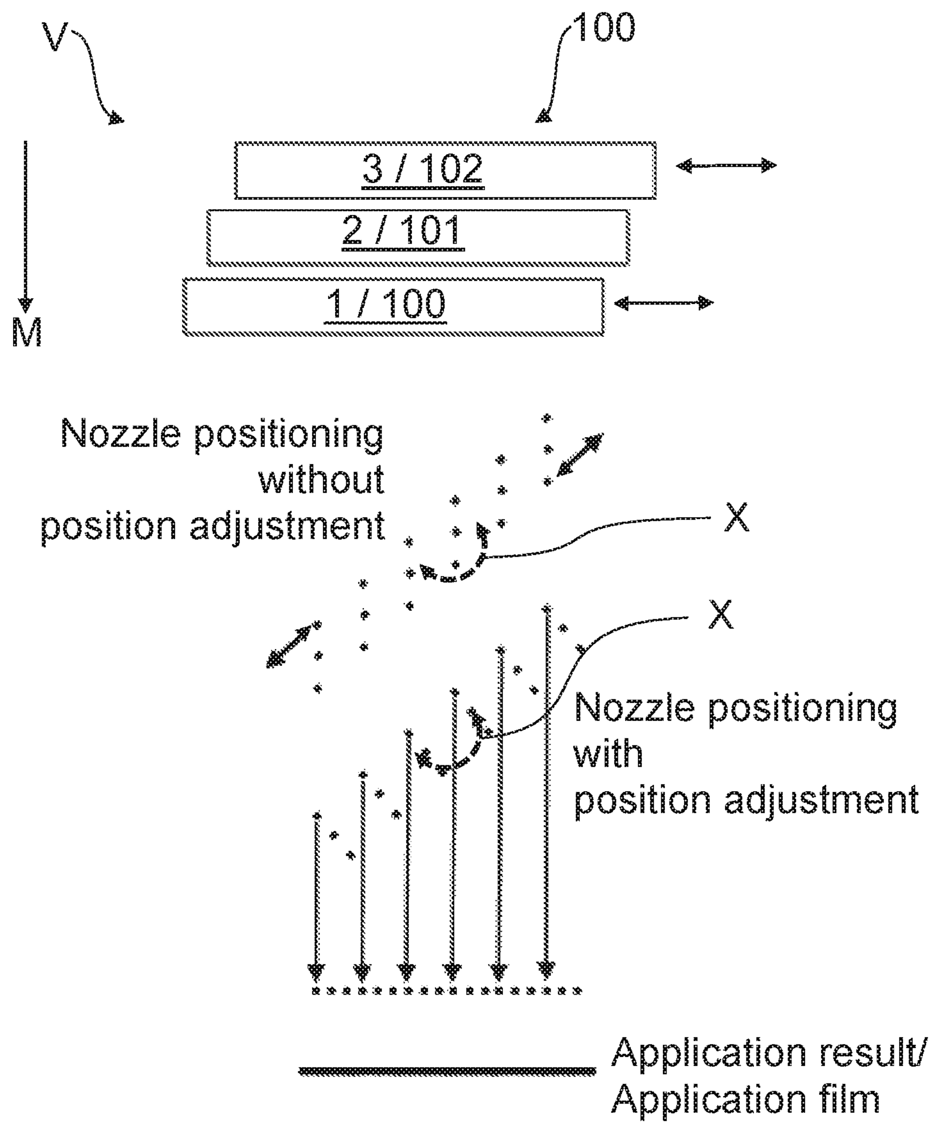
FIG. 3 shows a schematic view in order to represent the mode of operation of an application device according to one example of the disclosure.

FIG. 3 shows a schematic view to represent the mode of operation of an application device V according to one example of the disclosure. In this example too, individual nozzle rows 1, 2, 3 can also be movable relative to their print head 100, 101, 102 or, however, movable together with their print head 100, 101, 102, which should once again be illustrated in FIG. 3 by reference signs without and with brackets.

One particular feature of the example shown in FIG. 3 is that the position adjustment is not carried out by rotatable nozzle rows, but rather by virtue of the fact that first nozzle row 1/print head 100 and third nozzle row 3/print head 102 are longitudinally displaceable, which is indicated at the top in FIG. 3 by the two double arrows. Second nozzle row 2/print head 101 can, but does not have to have a movability function for the purpose of position adjustment.

FIG. 3 shows that a uniform, homogeneous paint film is possible despite rotation X.

Figure 4:
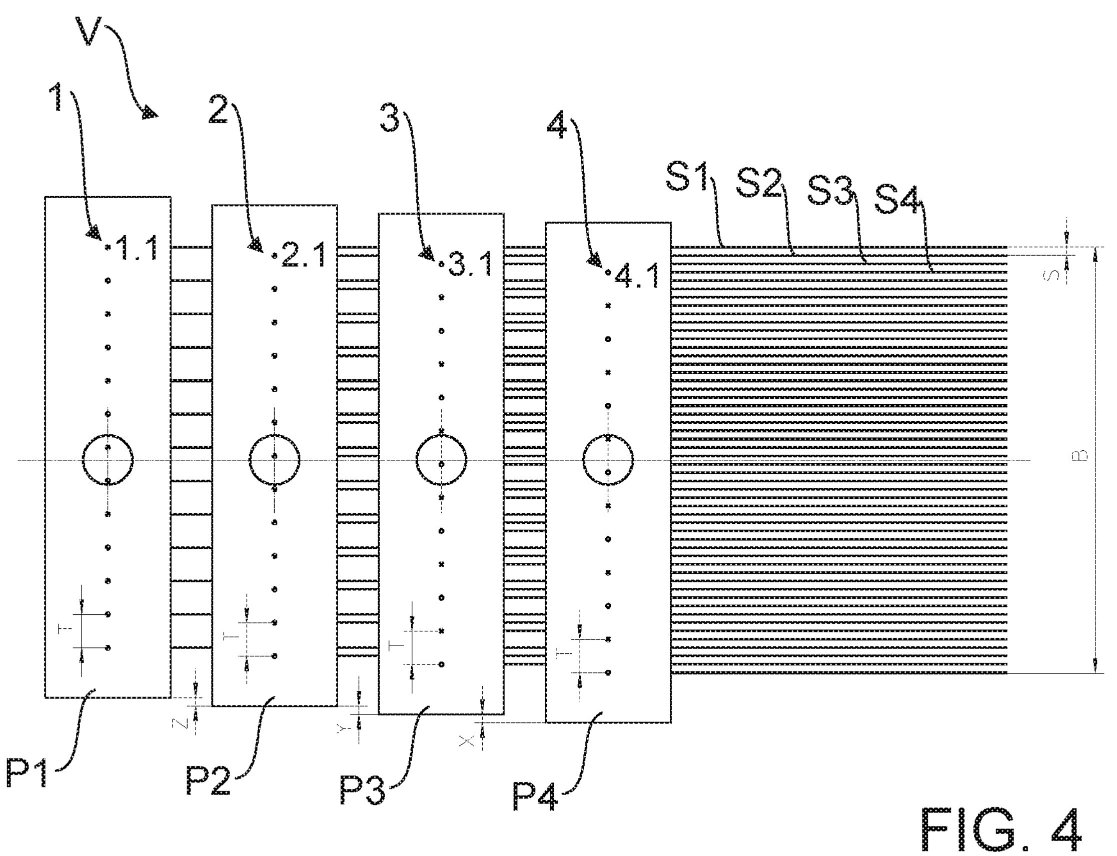
FIG. 4 shows a schematic view of four nozzle rows for an application device according to one example of the disclosure.

FIG. 4 shows a schematic view of four rotatable nozzle rows 1, 2, 3, 4 in four nozzle plates P1, P2, P3, P4 for an application device V according to one example of the disclosure.

First nozzle row 1 includes thirteen nozzles 1.1 for the output of thirteen application medium jets S1.

Second nozzle row 2 includes thirteen nozzles 2.1 for the output of thirteen application medium jets S2.

Third nozzle row 3 includes thirteen nozzles 3.1 for the output of thirteen application medium jets S3.

Fourth nozzle row 4 includes thirteen nozzles 4.1 for the output of thirteen application medium jets S4.

In FIG. 4, nozzle plates P1, P2, P3 and P4 are of identical design, but are, in the orientation shown, arranged offset in their longitudinal direction. Individual offsets Z, Y, X are therefore present for each nozzle plate P1, P2, P3, P4.

S designates the nozzle distances between nozzles 1.1, nozzles 2.1, nozzles 3.1 and nozzles 4.1.

B designates the track width.

Figure 5:
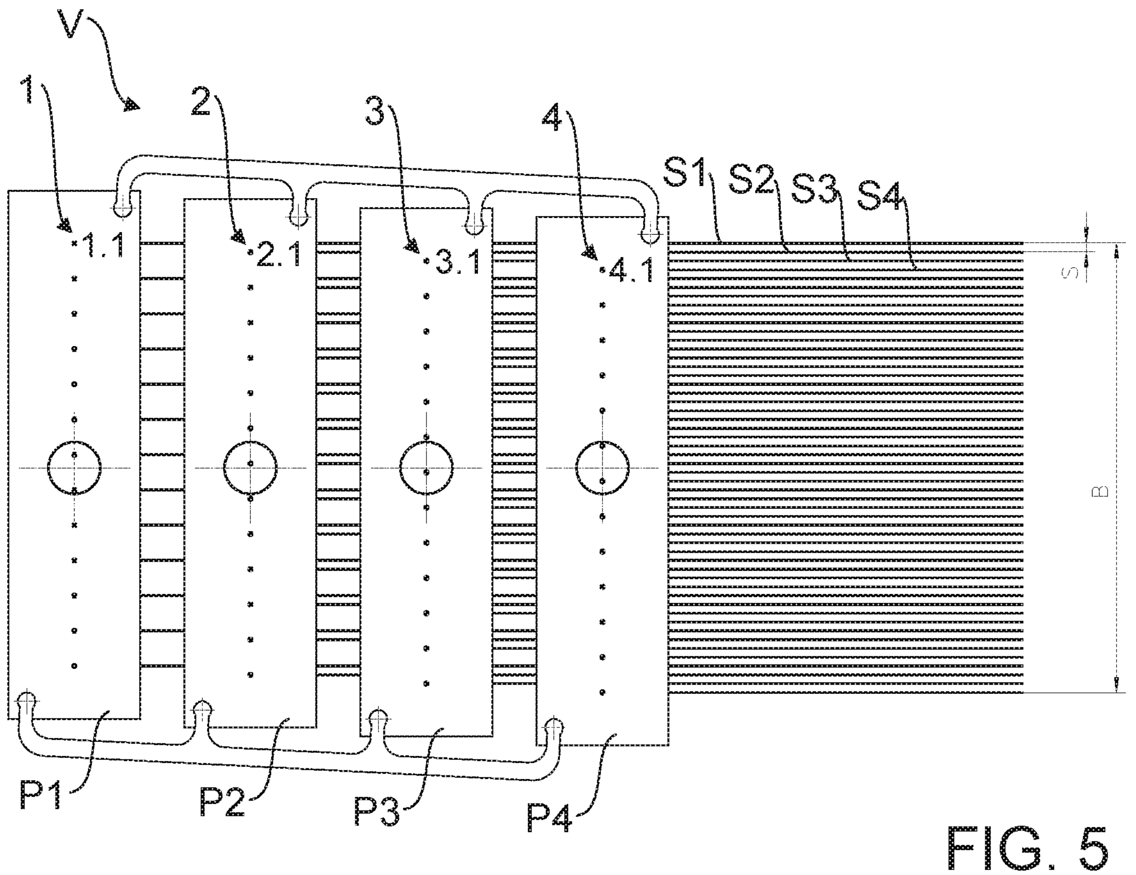
FIG. 5 shows a schematic view of four nozzle rows for an application device according to another example of the disclosure.

FIG. 5 shows a schematic view of, once again, four nozzle rows 1, 2, 3, 4 in four nozzle plates P1, P2, P3, P4 for an application device V according to one example of the disclosure.

In FIG. 5, the four nozzle rows 1, 2, 3, 4 are connected to one another by associated nozzle plates P1, P2, P3, P4 via a (in FIG. 5 upper and lower) mechanical coupling connection so that a movement of one of nozzle rows 1, 2, 3, 4 brings about a corresponding movement of other nozzle rows 1, 2, 3, 4 or vice versa, as a result of which e.g. a master/slave connection between nozzle rows 1, 2, 3, 4 can be enabled. The coupling connection furthermore advantageously leads to a synchronisation of the individual movements of nozzle rows 1, 2, 3, 4.

Individual nozzle rows 1, 2, 3, 4 can nevertheless also be driven separately by single drives for the purpose of position adjustment. In this case too, the coupling connection can ensure a uniform, synchronised movement of nozzle rows 1, 2, 3, 4.

Figure 6:
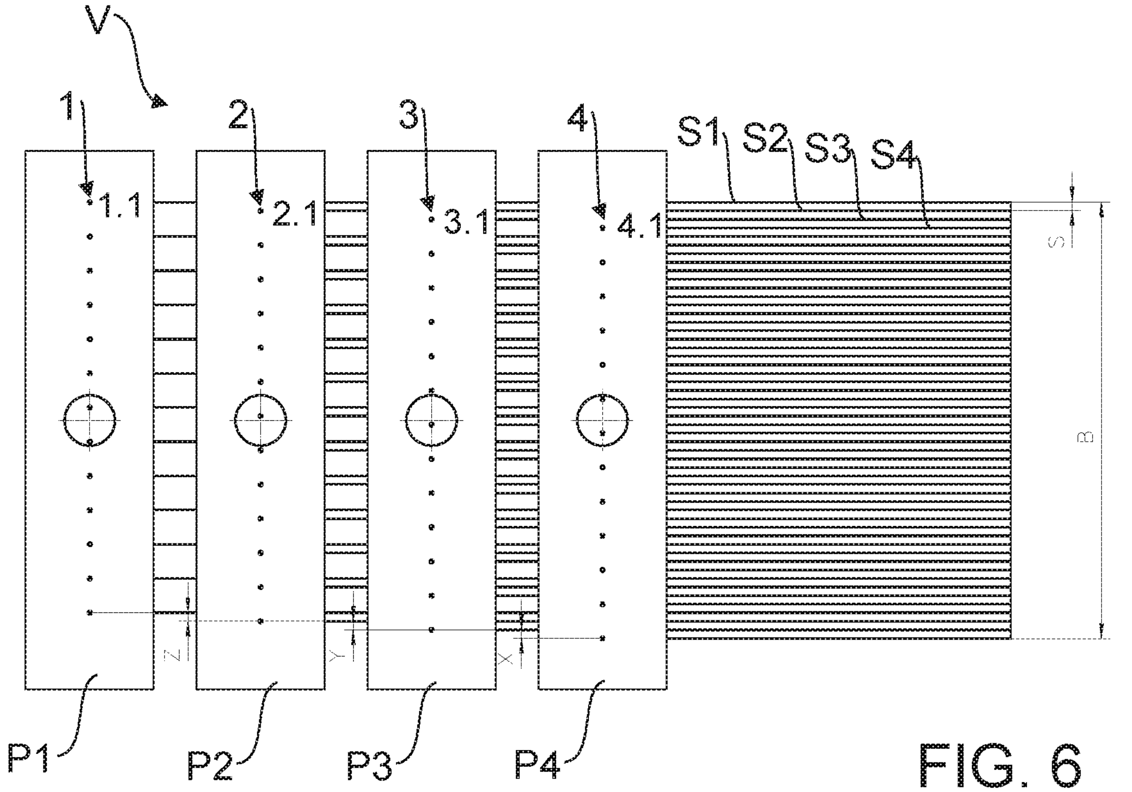
FIG. 6 shows a schematic view of four nozzle rows for an application device according to yet another example of the disclosure.

FIG. 6 shows a schematic view of four nozzle rows 1, 2, 3, 4 in four nozzle plates P1, P2, P3, P4 for an application device V according to one example of the disclosure.

One feature of the example shown in FIG. 6 is that nozzle plates P1, P2, P3, P4 are not of identical design, but rather nozzle rows 1, 2, 3, 4 have an offset X-Y-Z for each nozzle row 1, 2, 3, 4.

Figure 7:
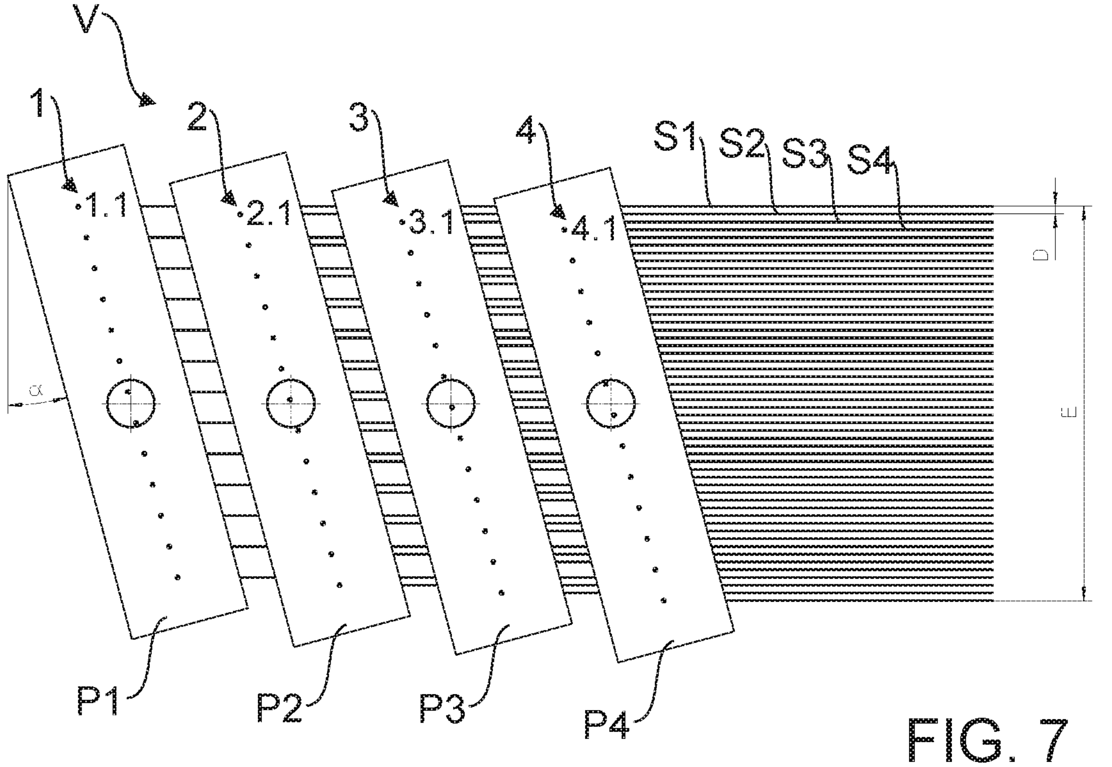
FIG. 7 shows a schematic view of four nozzle rows for an application device according to yet another example of the disclosure.

FIG. 7 shows a schematic view of, once again, four nozzle rows 1, 2, 3, 4 in four nozzle plates P1, P2, P3, P4 for an application device V according to one example of the disclosure, but in a position-adjusted location which is rotated in comparison with FIGS. 4 to 6.

The distances of the application medium impact points to one another and the track width become smaller, but the distances become equal across the entire track width. In particular a uniform layer thickness distribution and an optimal painting result follow from this.

D designates the nozzle distances between nozzles 1.1, nozzles 2.1, nozzles 3.1 and nozzles 4.1.

E designates the track width.

The following applies with regard to FIGS. 4 to 7:

α=Angle of rotation for position adjustment

D less than S

E less than B

Figure 8:
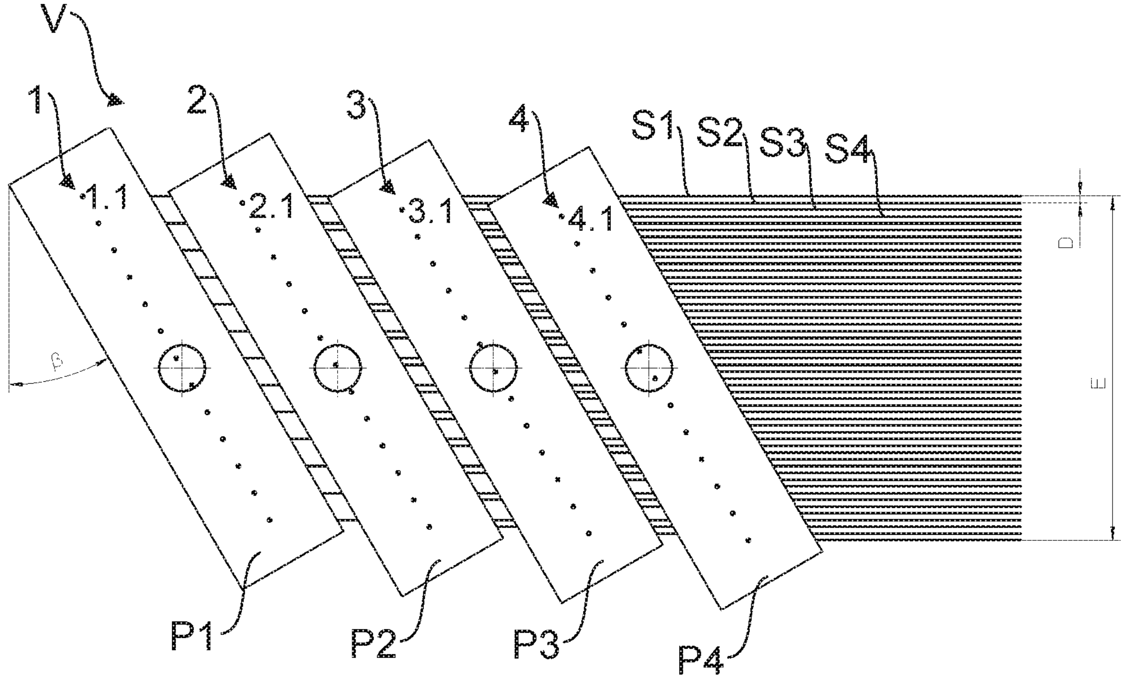
FIG. 8 shows a schematic view of four nozzle rows for an application device according to one example of the disclosure.

FIG. 8 shows a schematic view of, once again, four nozzle rows 1, 2, 3, 4 in four nozzle plates P1, P2, P3, P4 for an application device V according to one example of the disclosure, but in a position-adjusted location which is rotated to a greater extent in comparison with FIG. 7.

The following applies with regard to FIGS. 4 to 8:

β=Angle of rotation for position adjustment

D less than S

E less than B

Figure 9:
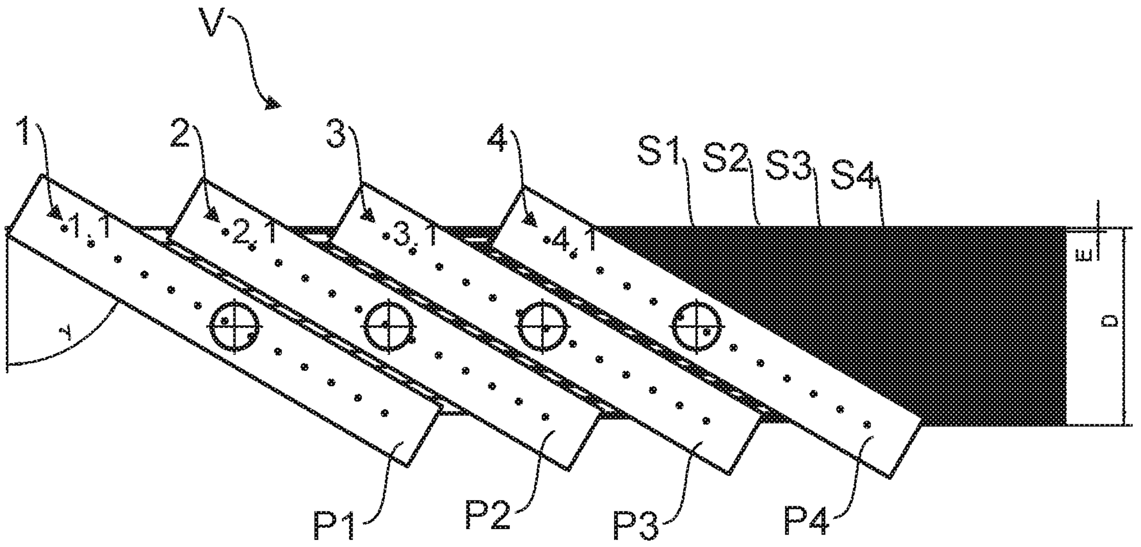
FIG. 9 shows a schematic view of four nozzle rows for an application device according to another example of the disclosure.

FIG. 9 shows a schematic view of, once again, four nozzle rows 1, 2, 3, 4 in four nozzle plates P1, P2, P3, P4 for an application device V according to one example of the disclosure, but in a position-adjusted location which is rotated to a greater extent in comparison with FIG. 8.

The following applies with regard to FIGS. 4 to 9:

Y=Angle of rotation for position adjustment

D less than S

E less than B

Figure 10:
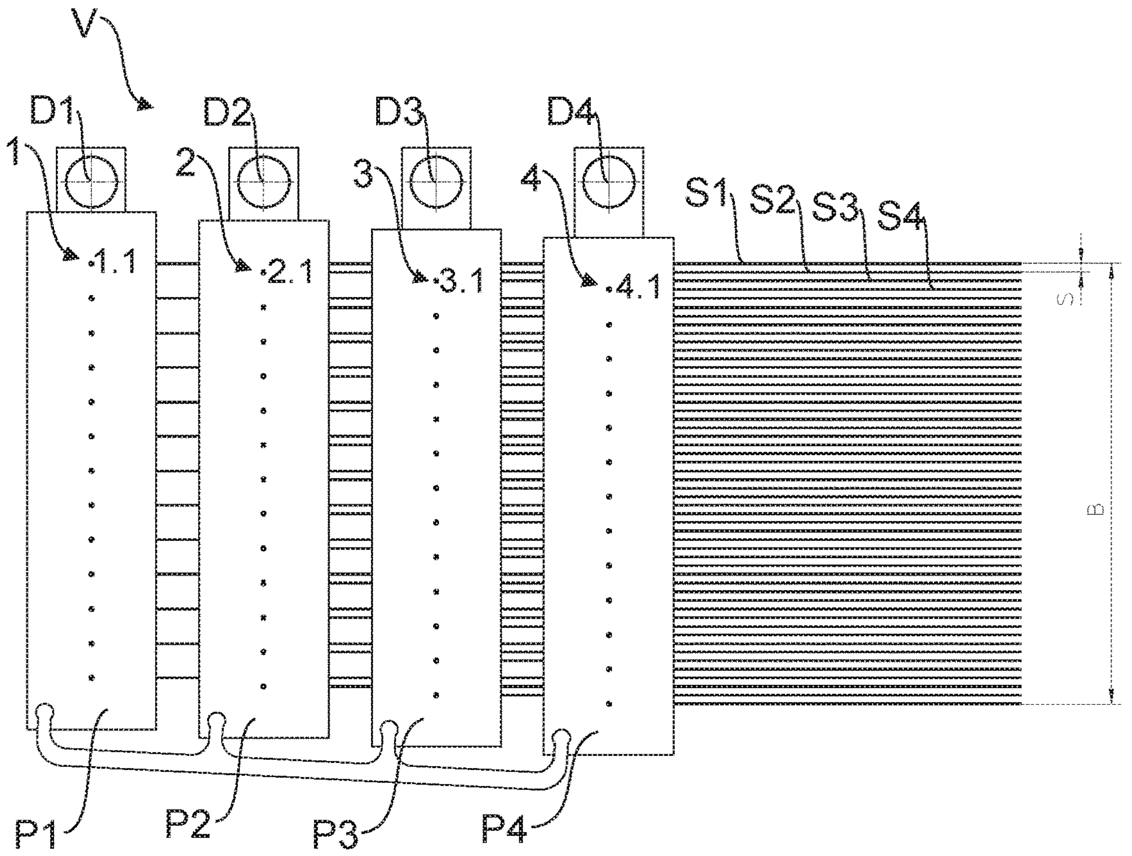
FIG. 10 shows a schematic view of four nozzle rows for an application device according to yet another example of the disclosure.

FIG. 10 shows a schematic view of, once again, four nozzle rows 1, 2, 3, 4 in four nozzle plates P1, P2, P3, P4 for an application device V according to one example of the disclosure.

First nozzle row 1 is rotatable about an eccentric, first axis of rotation D1, which is, however, arranged on the longitudinal axis of first nozzle row 1. Second nozzle row 2 is rotatable about an eccentric, second axis of rotation D2, which is, however, arranged on the longitudinal axis of second nozzle row 2. Third nozzle row 3 is rotatable about an eccentric, third axis of rotation D3, which is, however, arranged on the longitudinal axis of third nozzle row 3. Fourth nozzle row 4 is rotatable about an eccentric, fourth axis of rotation D4, which is, however, arranged on the longitudinal axis of fourth nozzle row 4. Axes of rotation D1, D2, D3, D4 are arranged in a row.

In one particular example, axes of rotation D1, D2, D3, D4 lie on a line. This line can point parallel to the painting direction.

In FIG. 10 at the bottom, a mechanical coupling connection for connection of nozzle rows 1, 2, 3, 4 can once again also be seen.

Figure 11:
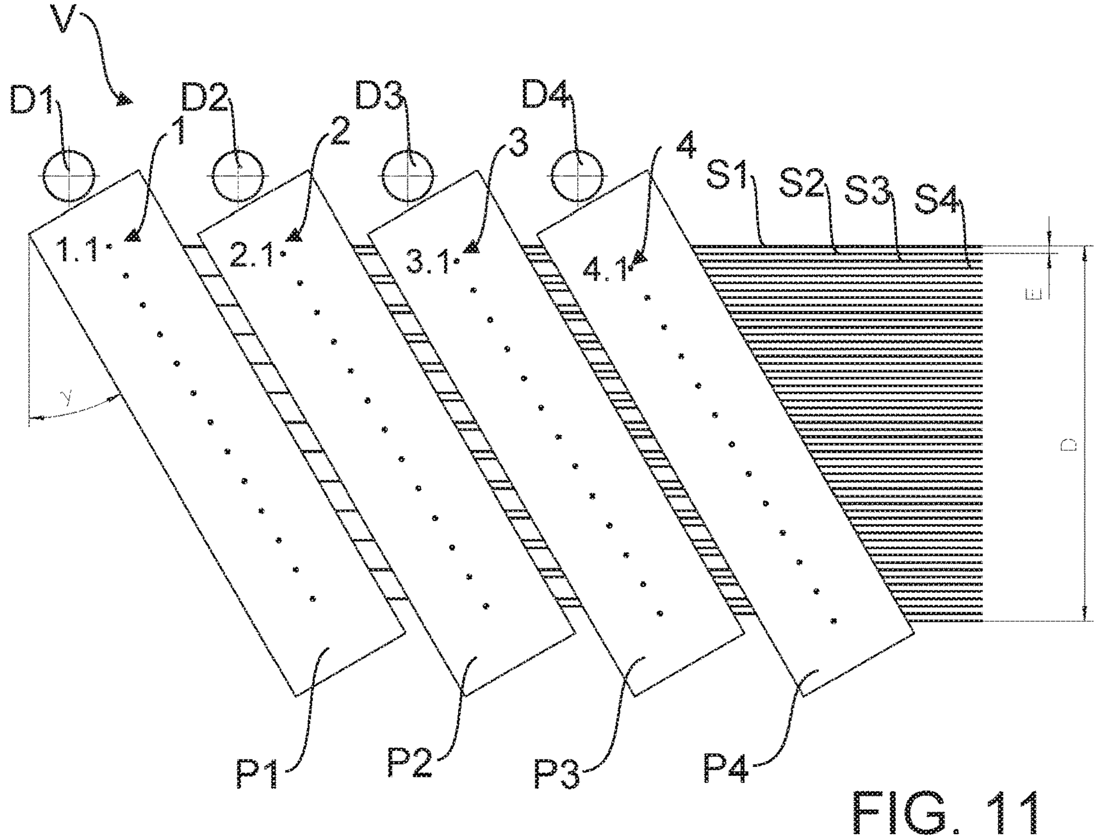
FIG. 11 shows a schematic view of four nozzle rows for an application device according to yet another example of the disclosure.

FIG. 11 shows a schematic view of, once again, four nozzle rows 1, 2, 3, 4 in four nozzle plates P1, P2, P3, P4 in a position-adjusted location for an application device V according to one example of the disclosure.

Figure 12:
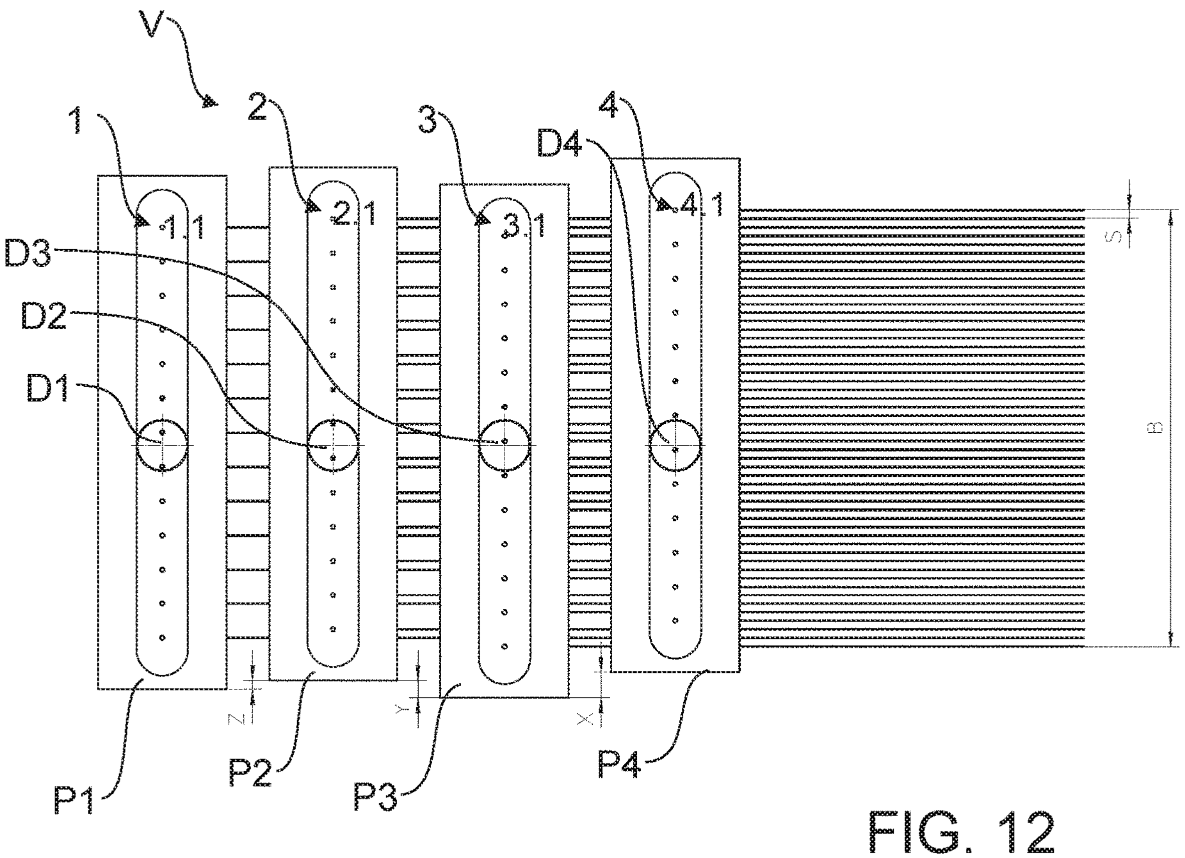
FIG. 12 shows a schematic view of four nozzle rows for an application device according to yet another example of the disclosure.

FIG. 12 shows a schematic view of, once again, four nozzle rows 1, 2, 3, 4 in four nozzle plates P1, P2, P3, P4 for an application device V according to one example of the disclosure.

Nozzle plates 1, 2, 3, 4 are of identical design, but arranged offset with respect to one another in their longitudinal direction so that individual uneven offsets X-Y-Z are present for each nozzle plate 1, 2, 3, 4.

A further particular feature is that axes of rotation D1, D2, D3, D4 are in each case arranged eccentrically with respect to respective nozzle row 1, 2, 3, 4, but nevertheless on the longitudinal axis of respective nozzle row 1, 2, 3, 4 and in a row with one another.

Figure 13:
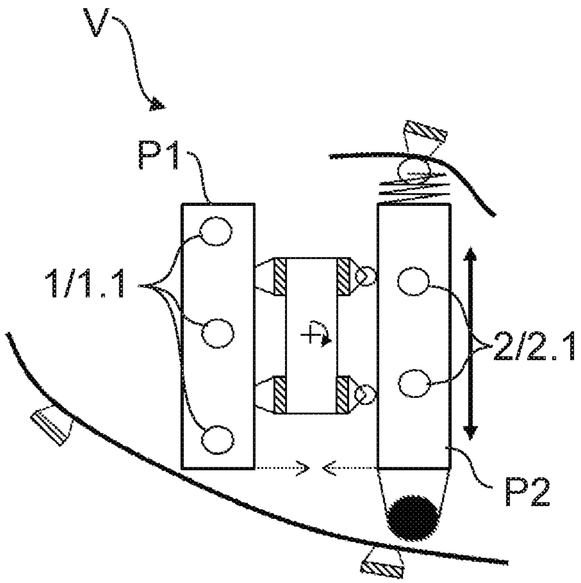
FIG. 13 shows a schematic view of a mechanism for coupling/guiding nozzle rows for an application device according to one example of the disclosure.
Figure 14:
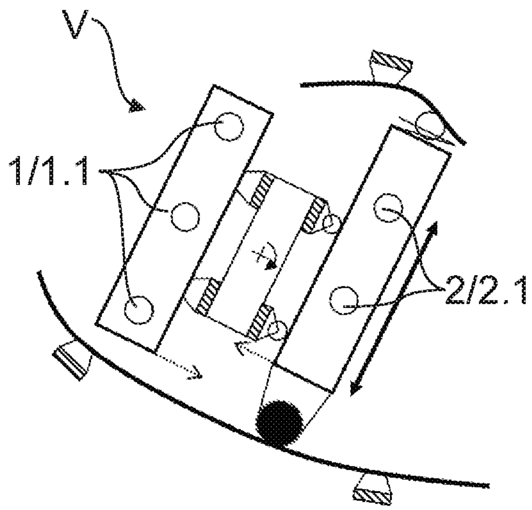
FIG. 14 shows a schematic view of the nozzle rows of FIG. 13 in a position-adjusted location.

FIG. 13 shows a schematic view of a mechanism for coupling, guiding and driving nozzle rows 1 and 2 (alternatively separate print heads 100, 101) for an application device V according to one example of the disclosure, wherein FIG. 14 shows nozzle rows 1 and 2 in a position-adjusted location.

FIGS. 13 and 14 show in particular that a contour curve and/or cam disc mechanism can be used for the purpose of position adjustment.

Figure 15:
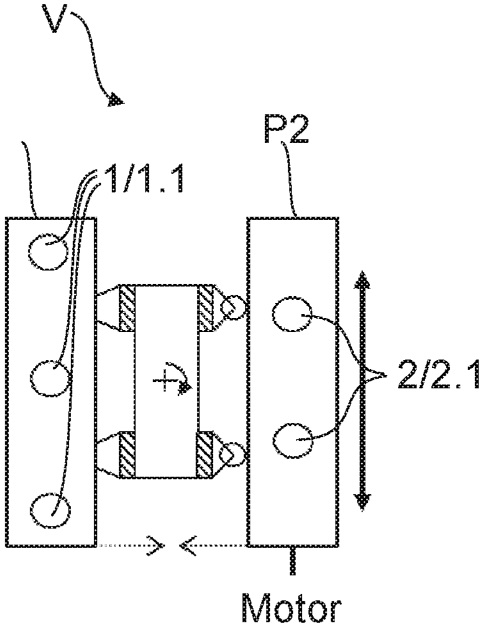
FIG. 15 shows a schematic view of a mechanism for coupling/guiding nozzle rows for an application device according to another example of the disclosure.
Figure 16:
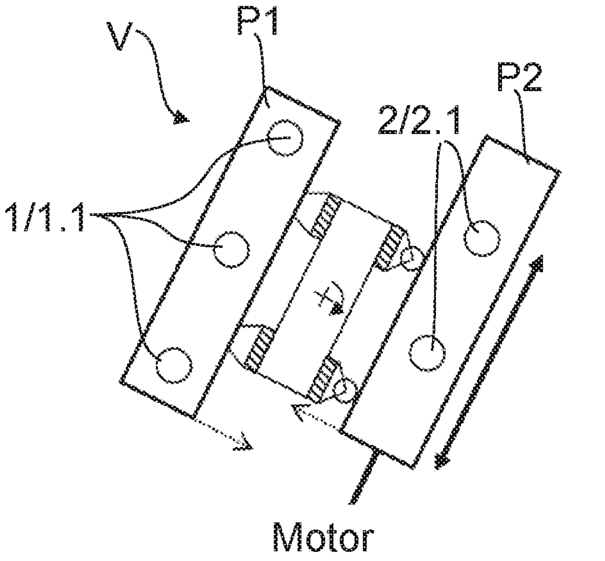
FIG. 16 shows a schematic view of the nozzle rows of FIG. 15 in a position-adjusted location.

FIG. 15 shows a schematic view of a mechanism for coupling, guiding and driving nozzle rows 1 and 2 (alternatively separate print heads 100, 101) for an application device V according to another example of the disclosure, wherein FIG. 16 shows nozzle rows 1 and 2 in a position-adjusted location.

Figure 17:
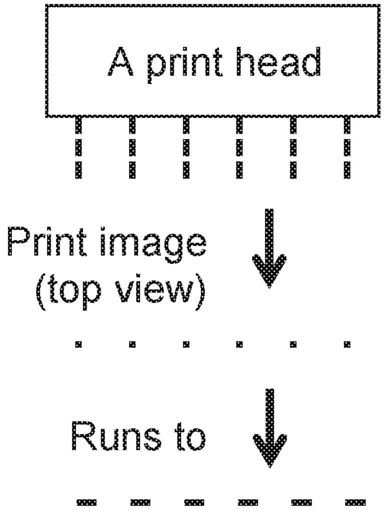
FIG. 17 shows a schematic view in order to illustrate a problem if nozzles of a print head, e.g. as a result of structural framework conditions, cannot be positioned closely enough to one another.

In FIGS. 15 and 16, a rotary servo motor M can be used to displace nozzle rows 1 and 2 for position adjustment. FIG. 17 illustrates the problem of a non-homogeneous or even not closed paint film.

Figure 18:
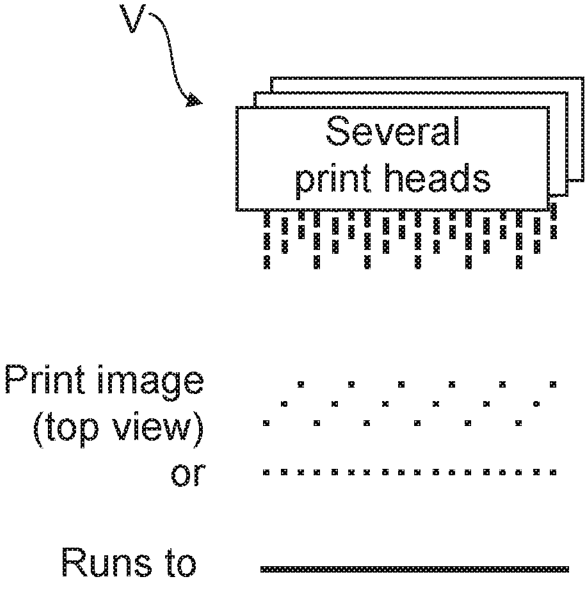
FIG. 18 shows a schematic view in order to illustrate if several print heads are arranged behind one another in order to increase area output and/or to enable a homogeneous application medium film according to one example of the disclosure.

FIG. 18 illustrates a possible solution for the problem explained in FIG. 17, namely the use of several print heads arranged behind one another.

FIG. 18 shows that the distances of the nozzles of the nozzle rows of the individual print heads can be reduced in size as a result of several print heads.

EXAMPLE

- 1 print head: 10 mm valve opening distance;
- 2 such print heads behind one another and offset in the longitudinal direction of the nozzle rows: 5 mm valve opening distance;
- 10 such print heads behind one another and offset in the longitudinal direction of the nozzle rows: 1 mm valve opening distance.

FIG. 19 on the left shows nozzle rows in a non-rotated position.

FIG. 19 on the right shows the nozzle rows after a rotation X about a common rotational axis by an application robot.

FIG. 19 on the right shows in particular the uneven nozzle distances between the nozzles of the nozzle rows which lead to an unacceptable, in particular non-homogeneous paint film.

Figure 20:
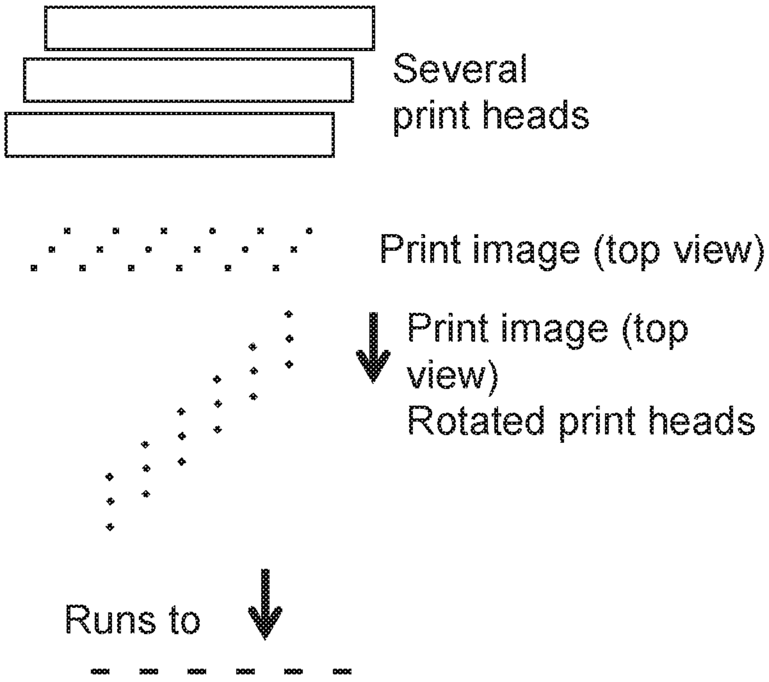

FIG. 20 illustrates the problem that, despite several print heads arranged behind one another, a rotation X of the print heads leads to a non-homogeneous or even not closed paint film.

Figure 21:
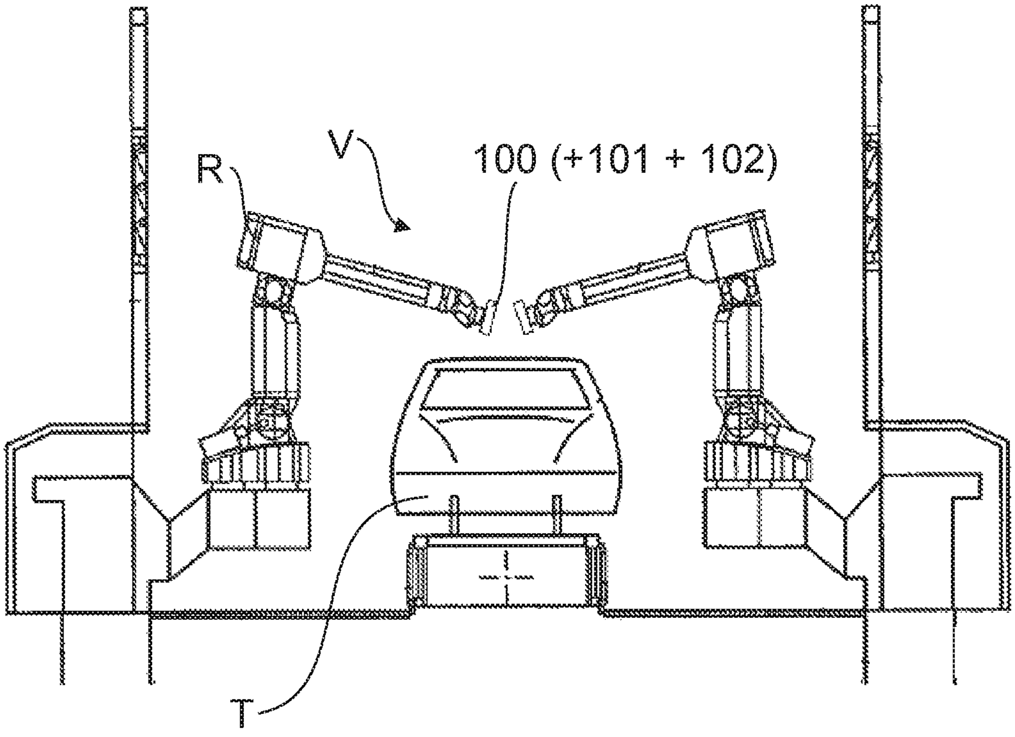
FIG. 21 shows two application robots according to one example of the disclosure.

FIG. 21 shows two application robots R with in each case one application device V as disclosed herein, wherein only left-hand application robot R is provided with a reference sign.

Application robot R preferably includes at least five or at least six movable robot axes and serves to guide one or more print heads 100 and thus in particular also to guide at least two nozzle rows 1, 2, as disclosed herein. The at least one print head 100 serves the purpose of atomisation-free application in series of the application medium onto a component T in the form of a motor vehicle body. A rotation X of the at least one print head 100 is performed by the wrist axis of the application robot with support on the robot mechanism.

Figure 22:
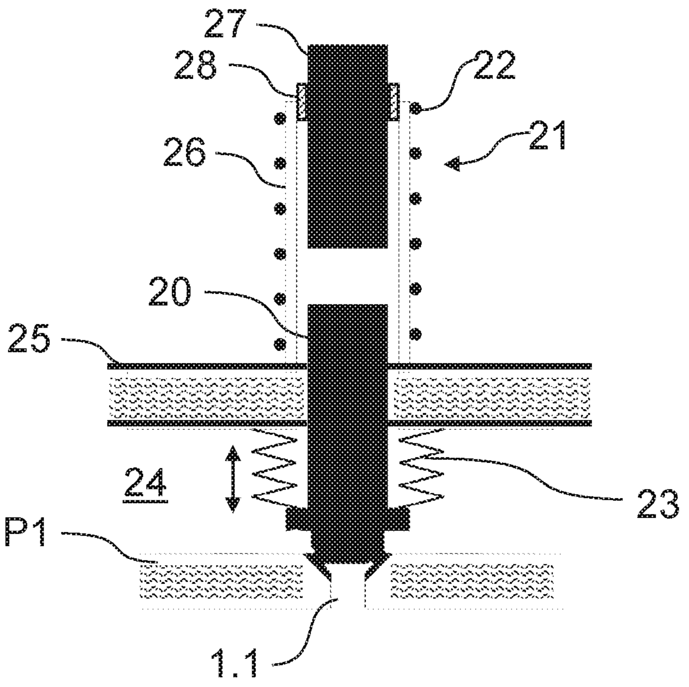
FIG. 22 shows a part of a print head according to one example of the disclosure.

FIG. 22 shows a schematic/detailed view of a part of print head 100.

FIG. 22 shows a nozzle plate P1 and a nozzle 1.1 in nozzle plate P1. A preferably magnetic valve element 20 (e.g. armature or valve needle) which is movable relative to nozzle plate P1 serves to control the application medium output through nozzle 1.1, wherein movable valve element 20 closes nozzle 1.1 in a closing position and releases it in an opening position. An electromechanical drive (expediently valve drive) 21 serves to move valve element 20. Print head 100 has a plurality of such nozzles 1.1, with in each case associated valve element 20 and associated drive 21.

Drive 21 includes an electric coil 22 for actuation of valve element 20 as a function of the energisation of coil 22, in particular for actuation of valve element 20 into the opening position. Drive 21 further includes an elastic restoring element 23, e.g. a spiral spring, for actuation of valve element 20 into the closing position.

The application medium to be applied is supplied to nozzles 1.1 via an application medium supply 24 in print head 100. Application medium supply 24 is (in FIG. 22 at the bottom) restricted by nozzle plate P1 and (in FIG. 22 at the top) by a further plate 25, wherein nozzle plate 1 and plate 25 can be separate components or part of an e.g. one-piece/integral (e.g. round or rectangular) tubular application medium supply 24.

Plate 25 has, coaxially with respect to nozzle 1.1, an opening on which a coil tube 26 is placed coaxially, wherein coil tube 26 is wound with coil 22.

A magnetic coil core 27, which at the upper end of coil tube 26 in FIG. 3 can be sealed off by a seal 28 from coil tube 26, is located in coil tube 26.

Moreover, valve element 20, which is displaceable in the direction of the double arrow, is located in sections in coil tube 26, wherein the movement of valve element 20, as already mentioned, is dependent on the energisation of coil 22.

FIG. 22 shows valve element 20 in this case in a closing position in order to close nozzle 1.1. In contrast, for an application of the application medium, coil 22 is energised so that valve element 20 is pulled upwards in FIG. 22 in order to release nozzle 1.1.

Restoring spring 23 pushes valve element 20 into the closing position if coil 22 is de-energised.

In a first mode of operation, coil 22 can hold valve element 20 permanently in the opening position, for generation of a continuous application medium jet. Restoring element 10 expediently serves to move valve element 20 in idle phases into the closing position.

In a second mode of operation, coil 22 and restoring element 23 can ensure that valve element 20 is moved to and fro between the opening position and the closing position with high frequency, in order to generate a droplet jet having separate droplets.

It should generally also be mentioned that the points of impact of the application medium jets resulting during the application process, which application medium jets can be realised in the context of the disclosure as continuous application medium jets and/or droplet jets comprising droplets, preferably have the same central distance to one another, so that a homogeneous application medium film can be produced during running (spreading) of the application medium on the component.

The disclosure is not restricted to the preferred exemplary examples described above. On the contrary, a plurality of variants and modifications are possible which also make use of the concept of the disclosure and thus fall into the scope of protection. The disclosure also encompasses various aspects of the disclosure which enjoy protection independently of one another.

The invention claimed is:

1. Application device for the application of an application medium onto a component, comprising:

at least one print head for application of the application medium and for mounting on an application robot, the print head movable in a direction of movement, at least three nozzle rows which can be moved by the application robot, wherein the at least three nozzle rows comprise a first nozzle row with several nozzles spaced along a longitudinal direction and for the output of application medium jets, a second nozzle row with several nozzles spaced along the longitudinal direction and for the output of application medium jets, and a third nozzle row with several nozzles spaced along the longitudinal direction and for the output of application medium jets, and a first nozzle plate having the first nozzle row and no additional nozzle rows, a second nozzle plate having the second nozzle row and no additional nozzle rows, and a third nozzle plate having the third nozzle row and no additional nozzle rows, characterised in that the nozzles of the second nozzle row are offset from the nozzles of the first nozzle row along the longitudinal direction, and the nozzles of the third nozzle row are offset from the nozzles of the second nozzle row along the longitudinal direction and are offset from the nozzles of the first nozzle row along the longitudinal direction, the first nozzle plate, the second nozzle plate, and the third nozzle plate are of identical design and are offset with respect to each other in the longitudinal direction such that individual uneven offsets are present for each nozzle plate and to provide the offset of the nozzles of the second nozzle row and the third nozzle row, the first nozzle row, the second nozzle row, and the third nozzle row are rotatable from a first position with the longitudinal direction extending perpendicular to the direction of movement of the print head to a second position with the longitudinal direction extending oblique to the direction of movement of the at least one print head, and a first motor serves to rotate the first nozzle row.

2. Application device according to claim 1, characterised in that the first nozzle row is movable in addition to the movement by means of the application robot.

3. Application device according to claim 1, characterised in that the first nozzle row is rotatably supported at an axis of rotation.

4. Application device according to claim 3, characterised in that the axis of rotation is positioned eccentrically with respect to the first nozzle row.

5. Application device according to claim 3, characterised in that a) the axis of rotation a1) is positioned on the longitudinal axis of the first nozzle row, and/or a2) is positioned outside or inside the first nozzle row, and/or b) that all the pivot points lie on one line or in the case of doubled pivot points for each nozzle row two lines, and/or c) that the two lines are parallel, and/or d) that the line of the pivot points lies in the direction of travel, and/or e) that the robot ensures that the axes of rotation are moved in the painting direction.

6. Application device according to claim 3, characterised in that several nozzle rows are rotatable and have in each case their own axis of rotation, wherein the individual axes of rotation are evenly spaced apart from one another and/or are arranged in a row.

7. Application device according to claim 3, characterised in that the axis of rotation is positioned centrally with respect to the first nozzle row.

8. Application device according to claim 1, characterised in that the first nozzle row is longitudinally displaceable.

9. Application device according to claim 1, characterised in that the application device comprises a displacing and/or rotating mechanism for movement of the first nozzle row.

10. Application device according to claim 1, characterised in that the application device comprises, for the purpose of position adjustment, at least one motor for movement of the first nozzle row.

11. Application device according to claim 10, characterised in that the at least one motor comprises a sliding or rotational motor and/or servo motor.

12. Application device according to claim 10, characterised in that one motor serves the purpose of joint movement of the first nozzle row and the at least one of the second nozzle row or the third nozzle row so that, for the purpose of position adjustment, the first nozzle row and the at least one of the second nozzle row or the third nozzle row are movable.

13. Application device according to claim 1, characterised in that the first nozzle row and the at least one of the second nozzle row or the third nozzle row are actuated individually for the purpose of position adjustment.

14. Application device according to claim 1, characterised in that the application device has, for the purpose of position adjustment, at least one of the following:

at least one cam disc, at least one involute toothing.

15. Application device according to claim 1, characterised in that the application device comprises at least one control apparatus for calculating adjustment values for the position adjustment and for control of the first nozzle row and/or the application robot.

16. Application device according to claim 1 characterised in that the first nozzle row of the at least three nozzle rows is fitted on a second print head and for the purpose of position adjustment, at least one nozzle row of the at least three nozzle rows is movable relative to the second print head, or for the purpose of position adjustment, the at least one nozzle row of the at least three nozzle rows is movable jointly with the second print head so that the at least one nozzle row of the at least three nozzle rows is arranged in a stationary manner relative to the second print head and/or the movement of the first nozzle row of the at least three nozzle rows is caused by a movement of the second print head.

17. Application device according to claim 1 characterised in that the first nozzle row and the second nozzle row are arranged on one head and are movable relative to the one print head.

18. Application device according to claim 1 characterised in that the application device has a first print head and at least one further print head.

19. Application device according to claim 18, characterised in that the first print head comprises the first nozzle row and the at least one further print head comprises the second nozzle row.

20. Application device according to claim 18, characterised in that, for the purpose of position adjustment, the first nozzle row is movable relative to the first print head, or is jointly movable with the first print head so that the first nozzle row is arranged in a stationary manner relative to the first print head and/or the movement of the first nozzle row is caused by a movement of the first print head.

21. Application device according to claim 18, characterised in that, for the purpose of position adjustment, the second nozzle row is movable relative to the at least one further print head, or is jointly movable with the at least one further print head so that the second nozzle row is arranged in a stationary manner relative to the at least one further print head and/or the movement of the second nozzle row is caused by a movement of the at least one further nozzle print head.

22. Application device according to claim 18, characterised in that the first print head and/or the at least one further print head comprises at least two movable nozzle rows.

23. Application device according to claim 18, characterised in that the first print head and the at least one further print head are held by a holder apparatus and/or are embodied for mounting on one and the same application robot.

24. Application device according to claim 23, characterised in that the holder, for the purpose of position adjustment, enables a degree of freedom of movement for the first print head and/or the at least one further print head.

25. Application device according to claim 1, characterised in that the nozzles of the first nozzle plate, the nozzles of the second nozzle plate and the nozzles of the third nozzle plate do not overlap.

26. Application device according to claim 1, characterised in that the first nozzle row and the second nozzle row are arranged behind one another orthogonally with respect to their longitudinal direction.

27. Application device according to claim 1, characterised in that the first nozzle row and the second nozzle row are oriented parallel to one another before and after a position adjustment.

28. Application device according to claim 1, characterised in that single valves for control of the application medium output from the individual nozzles of the first nozzle row and/or the individual nozzles of the second nozzle row are provided, wherein the single valves have in each case a movable valve element in order to close the respective nozzle in a closing position and release it in an opening position, and have in each case an electromechanical drive for movement of the valve element.

29. Application device according to claim 1, characterised in that the at least one print head has at least one of the following features:

the at least one print head is embodied for atomisation-or spray mist-free application of the application medium, the at least one print head is configured for long-term operation and serves to surface area-coat the component, the at least one print head outputs a narrowly restricted application medium jet in contrast to a spray mist, the at least one print head outputs a droplet jet in contrast to an application medium jet which is continuous in the longitudinal direction of the jet, the at least one print head outputs an application medium jet which is continuous in the longitudinal direction of the jet in contrast to a droplet jet, the at least one print head has an application efficiency of at least 80%, 90%, 95% or 99% so that substantially the entire applied application medium is fully deposited on the component, the at least one print head has a surface coating output of at least 0.5 $m^2$/min, 1 $m^2$/min, 2 $m^2$/min or at least 3 $m^2$/min, the at least one print head has at least one electrically actuable actuator in order to output the application medium from the at least one print head.

30. Application device according to claim 1, characterised in that the first nozzle row and at least one of the second nozzle row or the third nozzle row are connected to one another via at least one connection in order to bring about a synchronisation of the movements of the first nozzle row and the at least one of the second nozzle row or the third nozzle row, and so that a movement of the first nozzle row brings about a corresponding movement of the at least one of the second nozzle row or the third nozzle row or vice versa.

31. Application device according to claim 1, characterised in that:

the nozzles of the first nozzle row and the nozzles of the second nozzle row define a first nozzle distance perpendicular to the direction of movement of the printhead, the nozzles of the second nozzle row and the nozzles of the third nozzle row define a second nozzle distance perpendicular to the direction of movement of the printhead, the first nozzle distance at the first position is greater than the first nozzle distance at the second position, and the second nozzle distance at the first position is greater than the second nozzle distance at the second position, and the first nozzle distance at the first position is the same as the second nozzle distance at the first position, and the first nozzle distance at the second position is the same as the second nozzle distance at the second position.

32. Application robot with at least one application device according to claim 1, wherein the application robot serves to guide the at least one print head and the at least three nozzle rows and has at least five movable robot axes.

33. Application method embodied by an application device according to claim 1, for application of an application medium onto a component.

* * * * *